(12) United States Patent
Yokomitsu

(10) Patent No.: US 8,306,129 B2
(45) Date of Patent: Nov. 6, 2012

(54) POWER LINE COMMUNICATION APPARATUS, POWER LINE COMMUNICATION SYSTEM, AND REGISTRATION PROCESSING METHOD

(75) Inventor: Yasushi Yokomitsu, Fukuoka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 12/388,376

(22) Filed: Feb. 18, 2009

(65) Prior Publication Data

US 2009/0207922 A1 Aug. 20, 2009

(30) Foreign Application Priority Data

Feb. 18, 2008 (JP) ................................. 2008-035930

(51) Int. Cl.
*H04B 3/54* (2006.01)

(52) U.S. Cl. ........ 375/257; 375/295; 375/288; 370/255; 370/395.52; 370/389; 370/466; 370/252; 370/401; 370/351

(58) Field of Classification Search ................. 375/295, 375/257, 288
See application file for complete search history.

(56) References Cited

U.S. PATENT DOCUMENTS

| | | | | | |
|---|---|---|---|---|---|
| 5,255,341 | A * | 10/1993 | Nakajima | ..................... | 704/200 |
| 7,630,401 | B2 * | 12/2009 | Iwamura | ..................... | 370/468 |
| 7,672,265 | B2 * | 3/2010 | Kwak | ........................ | 370/320 |
| 7,852,207 | B2 * | 12/2010 | Berkman et al. | ......... | 340/538.16 |
| 7,885,633 | B2 * | 2/2011 | Schwager et al. | ............ | 455/402 |
| 2004/0161041 | A1 * | 8/2004 | Logvinov et al. | ............ | 375/257 |
| 2005/0018784 | A1 * | 1/2005 | Kurobe et al. | ................ | 375/260 |
| 2008/0126804 | A1 | 5/2008 | Zhang | | |
| 2008/0141069 | A1 * | 6/2008 | Iwamura | ........................ | 714/14 |
| 2009/0190558 | A1 * | 7/2009 | Strutt et al. | ................... | 370/332 |
| 2011/0231727 | A1 * | 9/2011 | Kure et al. | .................... | 714/751 |

FOREIGN PATENT DOCUMENTS

JP 2007-336583 12/2007

* cited by examiner

*Primary Examiner* — Siu Lee
(74) *Attorney, Agent, or Firm* — Dickinson Wright PLLC

(57) ABSTRACT

A power line communication apparatus controls a transmission using a plurality of parameters. The power line communication apparatus includes: a registration processor which performs a registration process for achieving a state to be communicable with another power line communication apparatus through a power line by use of transmission data based on a first parameter set at a first value and a second parameter set at a second value, a parameter controller which changes the first parameter to the third value to lengthen a communicable distance and the second parameter to the fourth value to shorten the communicable distance when the registration process has ended in failure. When the registration process has ended in failure, the registration processor retry the registration process by use of transmission data based on the first parameter set at a third value and the second parameter set at a fourth value.

10 Claims, 15 Drawing Sheets

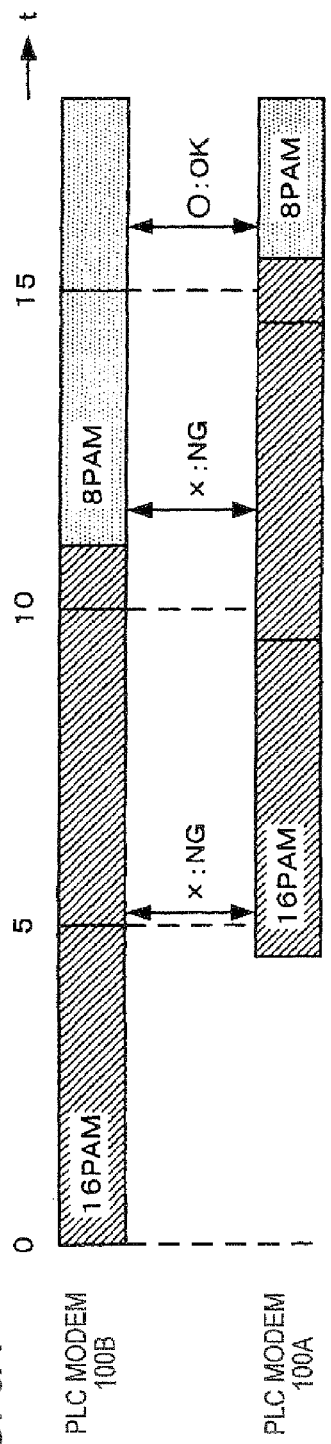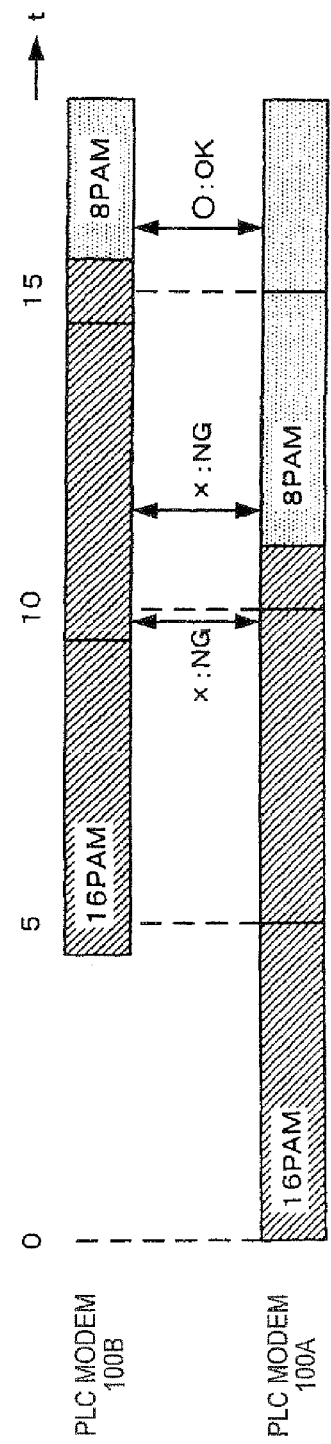

POWER LINE COMMUNICATION APPARATUS, POWER LINE COMMUNICATION SYSTEM, AND REGISTRATION PROCESSING METHOD

BACKGROUND

1. Technical Field

The present invention relates to a power line communication apparatus, a power line communication system, and a registration processing method.

2. Background Art

A power line communication apparatus that performs power line communication (PLC: Power Line Communication) by use of a power line can establish power line communication with another power line communication apparatus.

FIG. 15 shows an example communication environment of a power line communication apparatus. In the communication environment shown in FIG. 15, a plurality of L1-phase circuit breakers and L2-phase circuit breakers are provided in order to supply L1-phase electric power and L2-phase electric power to household electric appliances (consumer electronics) and power line communication apparatuses. Power lines are connected to the respective L1-phase and L2-phase circuit breakers. Household electric appliances and power line communication apparatuses are connected to the respective power lines by way of; for instance, outlets provided on walls. For instance, a power line communication apparatus 1500A is connected to a power line 700A by way of an outlet 1510A. A power line communication apparatus 1500B is connected to a power line 700B by way of an outlet 1510B. A power line communication apparatus 1500C is connected to a power line 700C by way of an outlet 1510C. Further, there are cases where electric equipment, such as power line communication apparatus and a household electric appliance, is connected to the outlet by way of a power strip.

As mentioned above, in a communication environment for power line communication, a variety of pieces of electric equipment, such as an electric device that does not perform power line communication, an electric device that implements power line communication, an electric device that causes a lot of noises, an electric device having a low impedance, and an electric device that does not affect another device in relation to power line communication, are connected to various power lines.

In a background power line communication, a communication characteristic is often deteriorated under various circumstances provided below.

As an example of deterioration of a communication characteristic, there may be an occurrence of attenuation of a signal due to a long distance between power line communication apparatuses that perform power line communication (e.g., the power line communication apparatus 1500A and the power line communication apparatus 1500C).

When power line communication is established between a power line communication apparatus connected to the L1-phase power line and a power line communication apparatus connected to the L2-phase power line (e.g., between the power line communication apparatus 1500A and the power line communication apparatus 1500C or between the power line communication apparatus 1500B and the power line communication apparatus 1500C), a signal sometimes undergoes attenuation for reasons of a phase difference.

Moreover, a communication characteristic achieved between power line communication apparatuses (e.g., between the power line communication apparatus 1500A and the power line communication apparatus 1500B or between the power line communication apparatus 1500A and the power line communication apparatus 1500C) is sometimes deteriorated under the influence of noise caused by a household electric appliance (e.g., a household electric appliance 1520A) connected to the power line.

Further, when a power line communication signal is absorbed by a household electric appliance having low impedance (e.g., a household electric appliance 1520B), signal attenuation often arises in power line communication between power line communication apparatuses (e.g., between the power line communication apparatus 1500A and the power line communication apparatus 1500B or between the power line communication apparatus 1500B and the power line communication apparatus 1500C).

A communicable distance over which the power line communication apparatuses can implement power line communication often becomes shorter as a result of occurrence of such deterioration of the communication characteristic.

A transmission device for performing retransmission process when a receiving side cannot have correctly received transmitted packet data has been known as an example technique for preventing deterioration of communication characteristics. The transmission device has parameter control unit that can switch a transmission parameter at the time of transmission of packet data according to a transmission channel state; transmission data control unit that divides stored retransmission data into a plurality of packets and that provides adaptive modulation control unit with the packets when transmission of an amount of data, which is to be performed for the case of new transmission, cannot be assured at the time of performance of retransmission; and adaptive modulation control unit that controls a modulation scheme and a decoding ratio in accordance with a transmission parameter switched by the parameter control unit in relation to each of the plurality of divided packets provided by the transmission data control unit and that sequentially transmits the plurality of packets as retransmission (see; for instance, JP-A-2007-336583).

Incidentally, in order to establish safe, reliable communication among two or more power line communication apparatuses, the power line communication apparatuses perform processing (hereinafter called registration processing) for bringing power line communication apparatuses into a communicable state. Authentication and security setting are performed through registration processing, whereby there is registered information about power line communication apparatuses serving as slave devices whose registration processing is managed by a power line communication apparatuses serving as a master device for managing registration processing.

A related-art registration processing is briefly described by reference to FIG. 16. Processing is based on the assumption that registration processing is performed between a power line communication apparatus 1600A serving as a master device and a power line communication apparatus 1600B serving as a slave device. When the power line communication apparatus 1600B has transmitted a registration request message (step S801), the power line communication apparatus 1600A transmits a receive ACK (a receive response) to the registration request message (step S802). When the receive ACK message responding to the registration request message shows permission, the power line communication apparatus 1600A transmits a registration start message to the power line communication apparatus 1600B (step S803), and the power line communication apparatus 1600B transmits to the power line communication apparatus 1600A a receive ACK responding to the registration start message (step S804).

When transmission of the registration start message and transmission of the receive ACK responding to the registration start message are performed, various pieces of information confidential between the power line communication apparatuses (e.g., MAC addresses unique to the power line communication apparatuses, a random number generated from a Time stamp, or the like) is transmitted to each other. The respective power line communication apparatuses 1600A and 1600B generate unique keys from various pieces of mutually-transmitted information. The power line communication apparatus 1600A transmits a successful registration notice message to the power line communication apparatus 1600B (step S805), thereupon completing registration processing. Related-art registration processing, such as that mentioned above, is hereinafter also referred to as basic registration processing.

Since the communicable distance of the power line communication apparatus becomes shorter for reasons of previously-described deterioration of the communication characteristic, the related-art power line communication apparatus often cannot correctly carry out registration processing. In the meantime, when a change is made to the transmission parameter such that the communicable distance becomes longer at the time of transmission of a signal in consideration of deterioration of the communication characteristic, registration processing is successfully carried out in conjunction with; for instance, a power line communication apparatus of a neighboring house, so that desired registration processing cannot be correctly carried out.

The present invention has been conceived to solve the situation and aims at providing a power line communication apparatus, a power line communication system, and a registration processing method that, even when a plurality of power line communication apparatuses are connected to a power line, enable reliable registration processing in conjunction with desired power line communication apparatuses without transmission of a registration signal over a distance up to a point where registration can be performed along with a power line communication apparatus of a neighboring house, by controlling a communicable distance.

SUMMARY

A power line communication apparatus according to the present invention is a power line communication apparatus for controlling a transmission using a plurality of parameters, the apparatus including: a registration processor which performs a registration process for achieving a state to be communicable with another power line communication apparatus through a power line by use of transmission data based on a first parameter set at a first value and a second parameter set at a second value, a parameter controller which changes the first parameter to the third value to lengthen a communicable distance and the second parameter to the fourth value to shorten the communicable distance when the registration process has ended in failure, and wherein when the registration process has ended in failure, the registration processor retry the registration process by use of transmission data based on the first parameter set at a third value and the second parameter set at a fourth value.

By means of the configuration, even when a plurality of power line communication apparatuses are connected to a power line, registration processing can be reliably performed along with a desired power line communication apparatus without transmission of a registration signal over a distance to a point where registration can be performed in conjunction with a power line communication apparatus of a neighboring house, by controlling a communicable distance.

When a plurality of power line communication apparatuses are connected in the network, the present invention makes it possible for desired power line communication apparatuses to reliably perform registration processing without involvement of transmission of a registration signal over a distance to a point where registration can be performed in conjunction with a power line communication apparatus of a neighboring house, by controlling a communicable distance.

BRIEF DESCRIPTION OF THE DRAWING

The above objects and advantages of the present invention will become more apparent by describing in detail preferred exemplary embodiments thereof with reference to the accompanying drawings, wherein like reference numerals designate like or corresponding parts throughout the several views, and wherein:

FIGS. 8A and 8B show example timing charts for the first applied registration processing according to the embodiment of the present invention;

DETAILED DESCRIPTION

A power line communication apparatus, a power line communication system, and a registration processing method according to an embodiment of the present invention will be described hereinafter by reference to the drawings.

Figure 1:
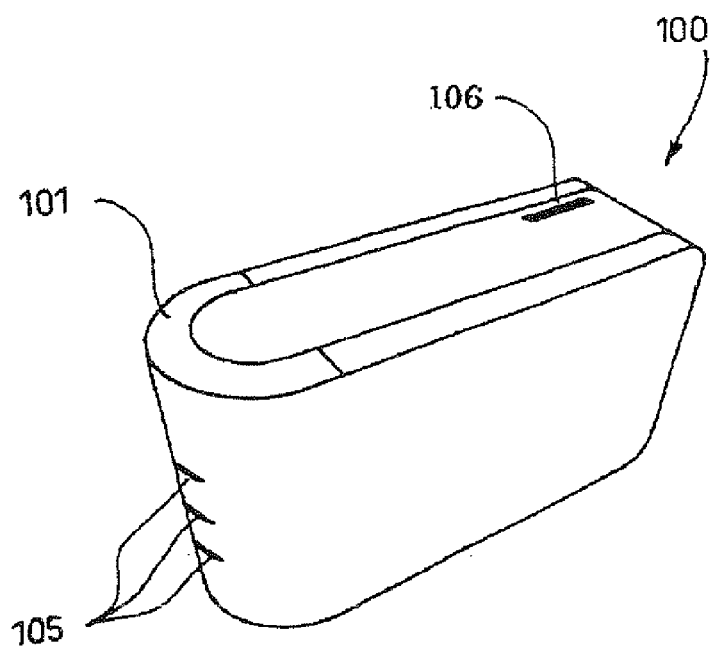
FIG. 1 is an external perspective view showing a front surface of a PLC modem according to an embodiment of the present invention.
Figure 2:
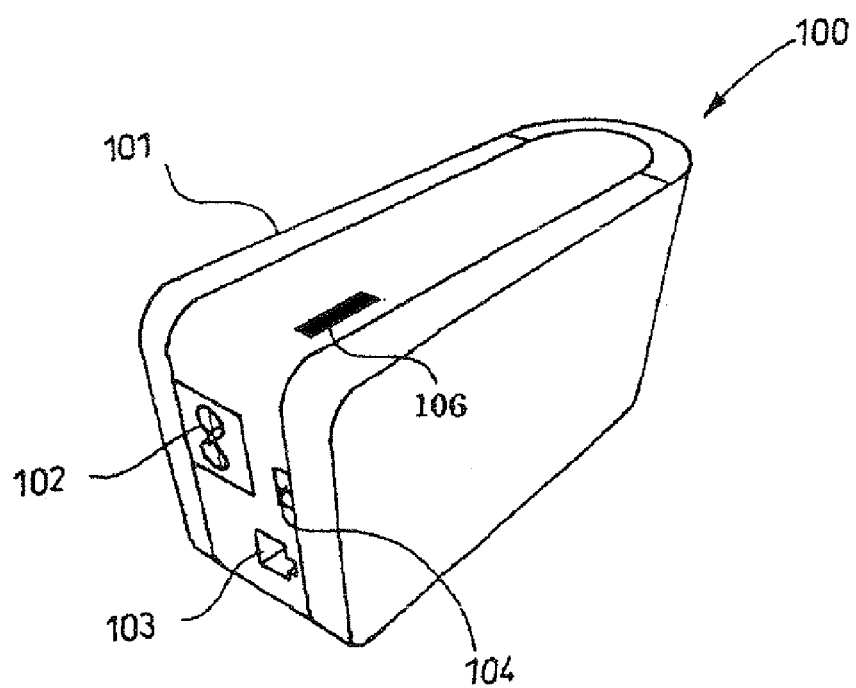
FIG. 2 is an external perspective view showing a rear surface of the PLC modem according to the embodiment of the present invention.

FIG. 1 is an external perspective view showing a front surface of a PLC (Power Line Communication) modem 100 that is an example of a power line communication apparatus, and FIG. 2 is an external perspective view showing a rear surface of the PLC modem 100. The PLC modem 100 shown in FIGS. 1 and 2 has a housing 101. Indicators 105 such as LEDs (Light Emitting Diodes) are provided on the front surface of the housing 101, as shown in FIG. 1.

As shown in FIG. 2, a power connector 102, a LAN (Local Area Network) modular jack 103, such as RJ45, and a selector switch 104 for switching an operation mode are provided on a rear surface of the housing 101.

A button 106 is provided on an upper surface of the housing. The button 106 exhibits a function as a setup button for initiating processing (registration processing) in order to bring the PLC modem 100 into a communicable state. The button is provided on the upper surface of the housing 101 as an exemplification but is not limited to the location.

An unillustrated power cable is connected to the power connector 102, and an unillustrated LAN cable is connected to the modular jack 103. A Dsub (D-subminiature) connector may also be provided on the PLC modem 100, and a Dsub cable may also be connected to the PLC modem.

Although the PLC modem 100 is shown as an example of the power line communication apparatus, an electric appliance having a built-in PLC modem may also be employed as the power line communication apparatus. The electric appliance includes; for instance, household electric appliances, such as a TV set, a telephone, a video deck, and a set-top box; office equipment, such as a personal computer, a facsimile, and a printer; and others.

The PLC modem 100 is connected to a power line 700, constituting a power line communication system in conjunction with other PLC modems 100.

Figure 3:
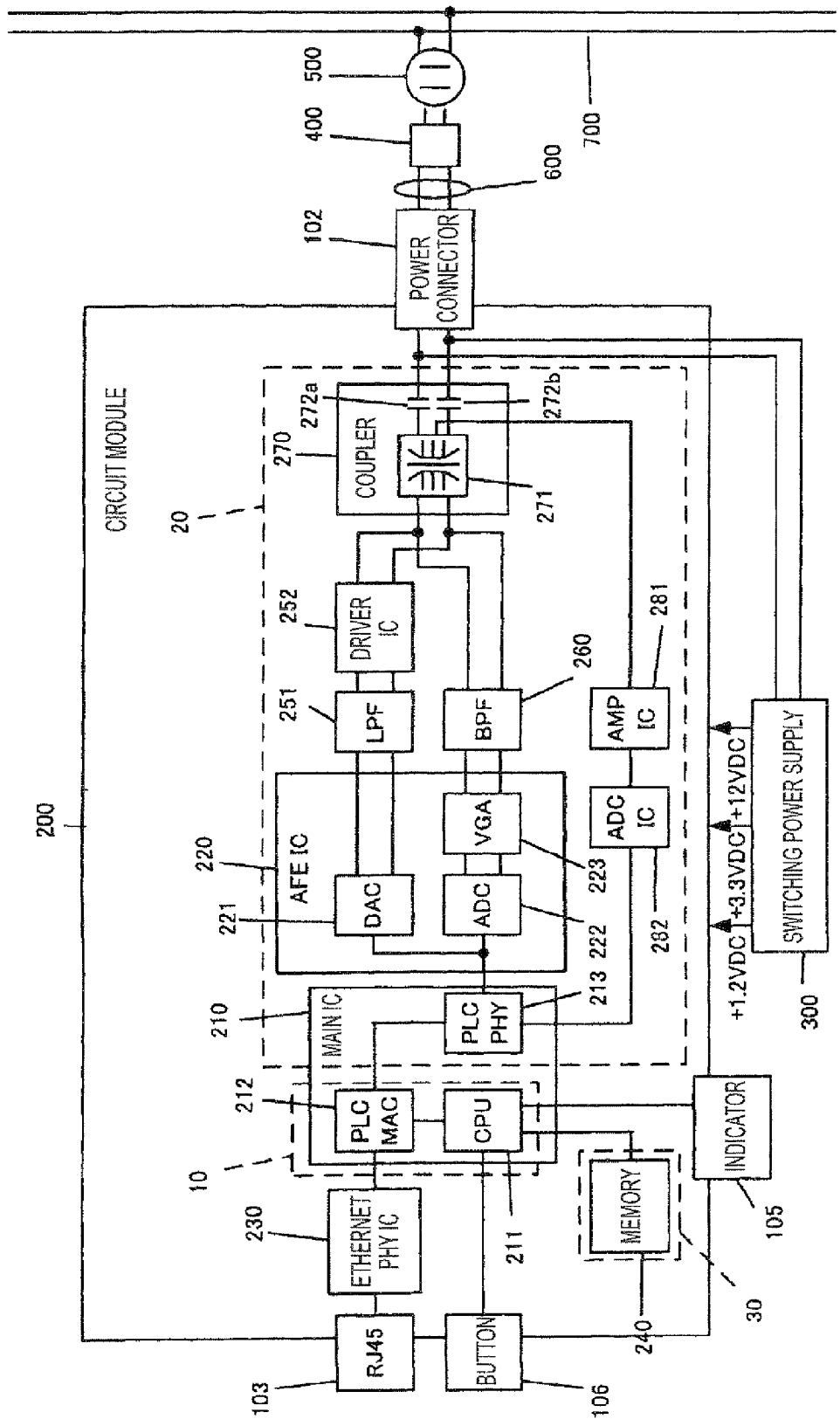
FIG. 3 shows an example of hardware of the PLC modem according to the embodiment of the present invention.

Next, FIG. 3 primarily shows an example hardware configuration of the PLC modem 100. The PLC 100 has a circuit module 200 and a switching power supply 300. The switching power supply 300 supplies the circuit module 200 with various voltages (e.g., +1.2V, +3.3V, and +12V) and is made up of; for instance, a switching transformer and a DC-DC converter (neither of them is illustrated).

The circuit module 200 is equipped with a main IC (Integrated Circuit) 210, an AFE•IC (Analog Front End•Integrated Circuit) 220, an Ethernet PHY•IC (Physical layer•integrated Circuit) 230, memory 240, a low-pass filter (LPF) 251, a driver IC 252, a bandpass filter (BPF) 260, a coupler 270, an AMP (amplifier) IC 281, and an ADC (AD converter) IC 282. The switching power supply 300 and the coupler 270 are connected to the power connector 102 and further to a power line 700 by way of a power cable 600, a power plug 400, and an outlet 500. The main IC 210 acts as a control circuit that establishes power line communication.

The main IC 210 is made up of a CPU (Central Processing Unit) 211, a PLC•MAC (Power Line Communication•Media Access Control layer) block 212, and a PLC•PHY (Power Line communication•Physical layer) block 213.

The CPU 211 is provided with a 32-bit RISC (Reduced Instruction Set Computer) processor. The PLC•MAC block 212 manages a MAC layer (Media Access Control layer) of a transmission/receive signal, and the PLC•PHY block 213 manages a PHY layer (Physical layer) of the transmission/receive signal.

The AFE•IC 220 is made up of a DA converter (DAC; D/A converter) 221, an AD converter (ADC; AND converter) 222, and a variable amplifier (VGA; Variable Gain Amplifier) 223. The coupler 270 is made up of a coil transformer 271 and coupling capacitors 272a and 272b.

The CPU 211 controls operation of the PLC•MAC block 212 and the PLC•PHY block 213 by utilization of data stored in the memory 240 and also controls the entirety of the PLC modem 100.

Communication effected by the PLC modem 100 is substantially carried out as described below. Data input from the modular jack 103 are transmitted to the main IC 210 by way of the Ethernet PHY•IC 230, where the data are subjected to digital signal processing, to thus generate a digital transmission signal. The thus-generated digital transmission signal is converted into an analog signal by means of the DA converter (DAC) 221 of the AFE•IC 220 and output to the power line 700 by way of the low-pass filter 251, the driver IC 252, the coupler 270, the power connector 102, the power cable 600, the power plug 400, and the outlet 500.

A signal received from the power line 700 is delivered to the bandpass filter 260 by way of the coupler 270, and a gain of the signal is adjusted by the variable amplifier (VGA) 223 of the AFE•IC 220. Subsequently, the signal is converted into a digital signal by the AD converter (ADC) 222. The thus-converted digital signal is sent to the main IC 210, where the signal is subjected to digital signal processing, to thus be converted into digital data. The converted digital data are output from the modular jack 103 by way of the Ethernet PHY•IC 230.

The function of the PLC modem 100 is now described. As indicated by a dotted line in FIG. 3, the CPU 211 and the PLC•MAC block 212 operate as the controller 10. The PLC•PHY block 213, AFE•IC 220, the LPF 251, the driver IC 252, the BPF 260, and the coupler 270 operate as a communicator 20. Further, the memory 240 operates as a storage 30.

The controller 10 performs various operations for controlling the entirety of the PLC modem 100 and also performs monitoring, analysis, and the like, of a signal transmitted and received by the communicator 20 through communication established with other PLC modems 100.

The communicator 20 performs various types of communication with other PLC modems 100 in the network.

For instance, the controller 10 and the communicator 20 have a function as a registration processor that performs predetermined registration processing for realizing a communicable state with another PLC modem 100 by way of the power line 700 by use of transmission data based on a plurality of transmission parameters. The registration processing is used in the PLC modem 100. US2008/0126804A, the disclosure of which is hereby incorporated by reference, describes the predetermined registration processing for realizing the communicable state with the other PLC modem 100. The controller 10 has a function as a parameter controller that changes a transmission parameter. The communicator 20 also has a function as a mode change notifier that transmits a mode change notice for making a change to a transmission parameter. The communicator 20 also has a function as a mode change notice receiver that receives a mode change notice for changing a transmission parameter.

The storage 30 stores various types of parameter information, various data, and the like. The parameter information includes transmission parameter information used when the PLC modem 100 transmits data.

An example of the transmission parameter information will now be described. Transmission of the PLC modem 100 can be controlled by means of such transmission parameter information.

For instance, the followings are the transmission parameter information.

A) A parameter showing signal intensity (hereinafter also called "transmission power") of a transmission signal forming transmission data used in a registration processing B) A parameter showing the information volume to be superimposed on a carrier (a carrier wave) for transmitting transmission data, in particular a parameter showing the information volume to be corresponding to the number of constellation points of a modulated carrier for transmitting transmission data (e.g., level of QAM (Quadrature Amplitude Modulation), PAM (Pulse Amplitude Modulation) value)

C) A parameter showing the information volume (hereinafter referred to also as "error correction information volume") of error correcting capability including in the transmission data (for example, 1 bit error correcting capability and 2 bit error detection capability)

Each of these pieces of transmission parameter information further includes information about the following setting values.

D) Information about a setting value for a comparatively-short communicable distance employed when power line communication is established with another PLC modem 100.

E) Information about a setting value for a comparatively-long communicable distance.

F) Setting value information used for notification purpose (hereinafter referred to also as a "mode change notice") to change the communicable distance; namely, a setting value of the transmission parameter.

The setting value described in connection with "F" is a setting value that enables the PLC modem 100 to make the communicable distance longest and that is usually utilized for control communication and commonly provided in the PLC modem 100. In a general case, the setting value described in connection with "F" can be utilized at the time of registration processing of the PLC 100. Moreover, the setting values described in connection with "D" and "E" are setting values utilized for connection communication purpose to carry out registration processing. The setting value described in connection with "D" is shorter than the setting value described in connection with "E" in terms of a communicable distance.

Information about such setting values of the respective transmission parameters is stored in the storage 30. When the PLC modem 100 performs registration processing, any of the setting values is set in a setting register held in the CPU 211 for each transmission parameter. The setting value set in the setting register can be changed as necessary. A plurality of the setting registers are usually provided, and the setting registers may be separated into a setting register for control communication purpose (for "F") and a setting register for connection communication purpose (for "E" and "F"). Thereby, a mode change notice can be made in the middle of applied registration processing to be described later.

Descriptions will be provided below on the assumption that the transmission parameter described in connection with "A" is transmission power; that the transmission parameter described in connection with "B" is a PAM value; and that the transmission parameter described in connection with "C" is an error correction information volume. PAM values include 16 constellation points (16-PAM), 8 constellation points (8-PAM), 4 constellation points (4-PAM), 2 constellation points (2-PAM), and the like. For instance, 16-PAM and 8-PAM are utilized for transmission data employed in registration processing, and 2-PAM is utilized for a mode change notice. Alternatively, QAM may be adopted instead of PAM, to change a level of QAM. In this case, as the level of QAM increases, the communicable distance is made shorter, and as the level of QAM decreases, the communicable distance is made longer.

An example relationship between each of the setting values of the transmission parameters and a communicable distance is now described.

Figure 4A:
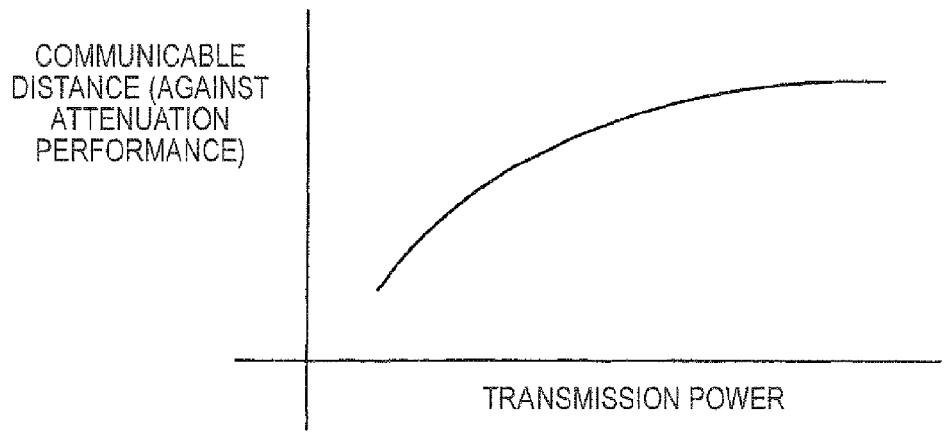
FIGS. 4A to 4C show an example relationship between setting values of respective transmission parameters and a communicable distance according to the embodiment of the present invention.
Figure 4B:
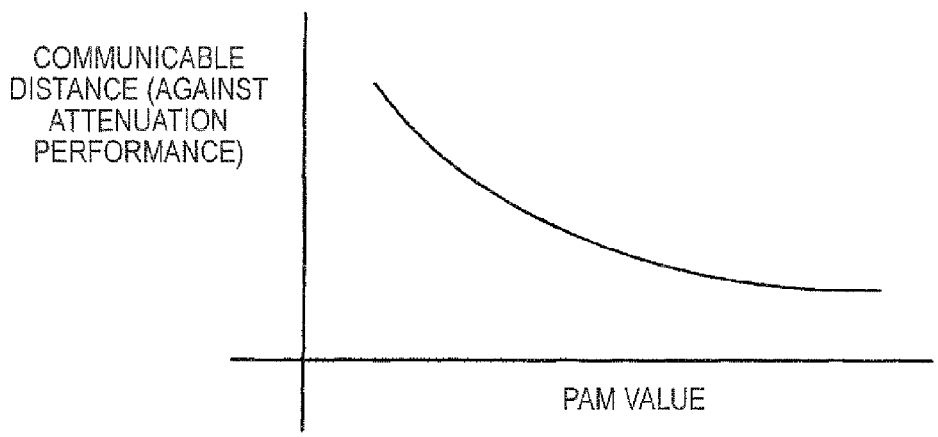
Figure 4C:
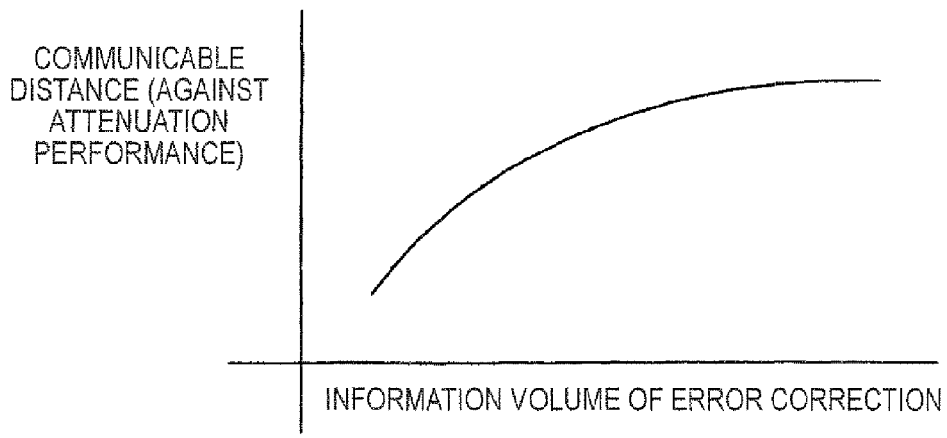

FIGS. 4A to 4C show an example relationship between each of the setting values of the transmission parameters and a communicable distance. FIG. 4A shows a case where the transmission parameter corresponds to transmission power; FIG. 4B shows a case where the transmission parameter corresponds to a PAM value; and FIG. 4C shows a case where the transmission parameter corresponds to an error correction information volume.

As shown in FIG. 4A, when transmission power is great, a communicable distance becomes longer. When transmission power is small, the communicable distance becomes shorter. As shown in FIG. 4B, when the PAM value is great, the communicable distance becomes shorter. When the PAM value is small, the communicable distance becomes longer. Further, as shown in FIG. 4C, when the error correction information volume is great, the communicable distance becomes greater. When the error correction information volume is small, the communicable distance becomes shorter.

Next, an example change in a setting value of a transmission parameter will be described.

In the PLC modem 100, when making a change to a transmission parameter the controller 10 changes a plurality of transmission parameters. This makes it possible to successfully perform registration processing with another desired PLC modem 100. Specifically, when one of the transmission parameters is changed such that the communicable distance becomes longer, one of the other transmission parameters is changed such that the communicable distance becomes shorter. Further, when one of the transmission parameters is changed such that the communicable distance becomes shorter, one of the other transmission parameters is changed such that the communicable distance becomes longer.

Consequently, even in a case where change of only one of the transmission parameters results in an increase in communicable distance, change of a plurality of transmission parameters makes it possible to perform registration processing with another desired PLC modem 100 at another timing without involvement of successful registration processing with an unexpected another PLC modem 100 (e.g., a PLC modem of a neighboring house). Even in a case where change of only one of the transmission parameters results in a decrease in communicable distance, change of a plurality of transmission parameters makes it possible to complete registration without involvement of unsuccessful registration processing with another PLC modem 100 located at a close range under the influence of noise, or the like.

Figure 5A:
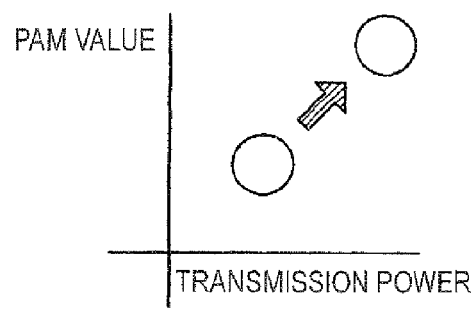
FIGS. 5A to 5F show a specific example of changes in a plurality of transmission parameters according to the embodiment of the present invention.
Figure 5B:
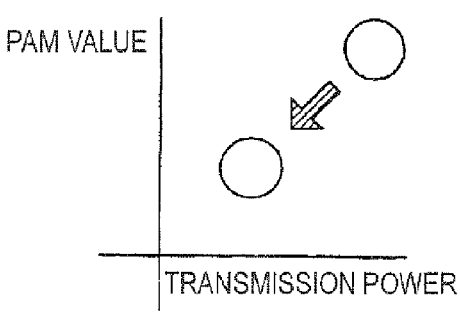
Figure 5C:
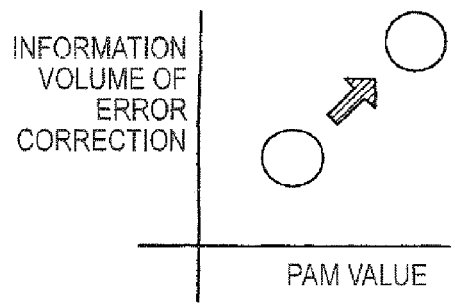
Figure 5D:
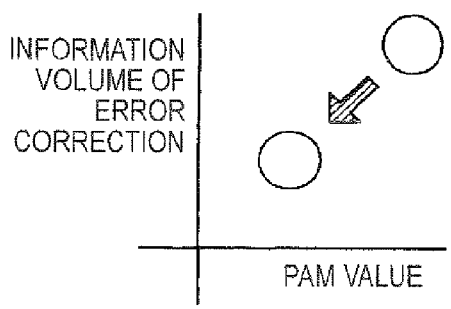
Figure 5E:
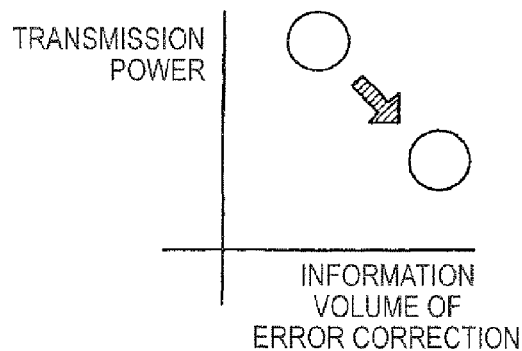
Figure 5F:
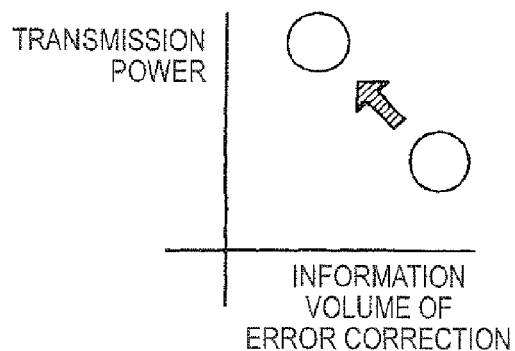

FIGS. 5A to 5F show a specific example change in a plurality of transmission parameters. FIG. 5A shows an increase (an increment) in transmission power and an increase in PAM value when the transmission power and the PAM value are changed. FIG. 5B shows a decrease (a decrement) in transmission power and a decrease in PAM value when the transmission power and the PAM value are changed. FIG. 5C shows an increase in PAM value and an increase in error correction information volume when the PAM value and the error correction information volume are changed. FIG. 5D shows a decrease in PAM value and a decrease in error correction information volume when the PAM value and the error correction information volume are changed. FIG. 5E shows an increase in error correction information volume and a decrease in transmission power when the error correction information volume and transmission power are changed. FIG. 5F shows a decrease in error correction information volume and an increase in transmission power when the error correction information volume and transmission power are changed.

An example of improved registration processing performed by the PLC modem 100 (hereinafter referred to also as "applied registration processing") is now described. Even when basic registration processing, which is related-art registration processing, has ended in failure, the transmission parameters are changed in applied registration processing, whereby all or a part of the basic registration processing operations are again carried out.

There will be described applied registration processing performed between a PLC modem 100A serving as a master device that manages applied registration processing and a PLC modem 100B serving as a slave device whose applied registration processing is managed. Basic registration processing included in applied registration processing must not always be managed by the PLC modem 100A serving as a master device as in a centralized system. In the case of, for instance, a distributed system, the essential requirement is any one of a power line communication system having and managing a function similar to that of the master device. Transmission and receive of data for performing applied registration processing are performed by the communicator 20 of each of the PLC modems 100.

Applied registration processing includes a first applied registration processing and a second applied registration processing, which will be described later. The first applied registration processing and the second applied registration processing are described hereunder.

(First Applied Registration Processing)

In the first applied registration processing, when the PLC modem 100 determines that performance of the basic registration processing ended in failure, the transmission parameters are changed. Change of the transmission parameters is waited until another PLC modem 100, which is a partner in the first applied registration processing, recognizes a failure in performance of the basic registration processing. When recognized the failure, the partner PLC modem 100 changes the transmission parameters. Subsequently, all or a part of the basic registration processing operations is again carried out by use of the thus-changed transmission parameters.

Figure 6:
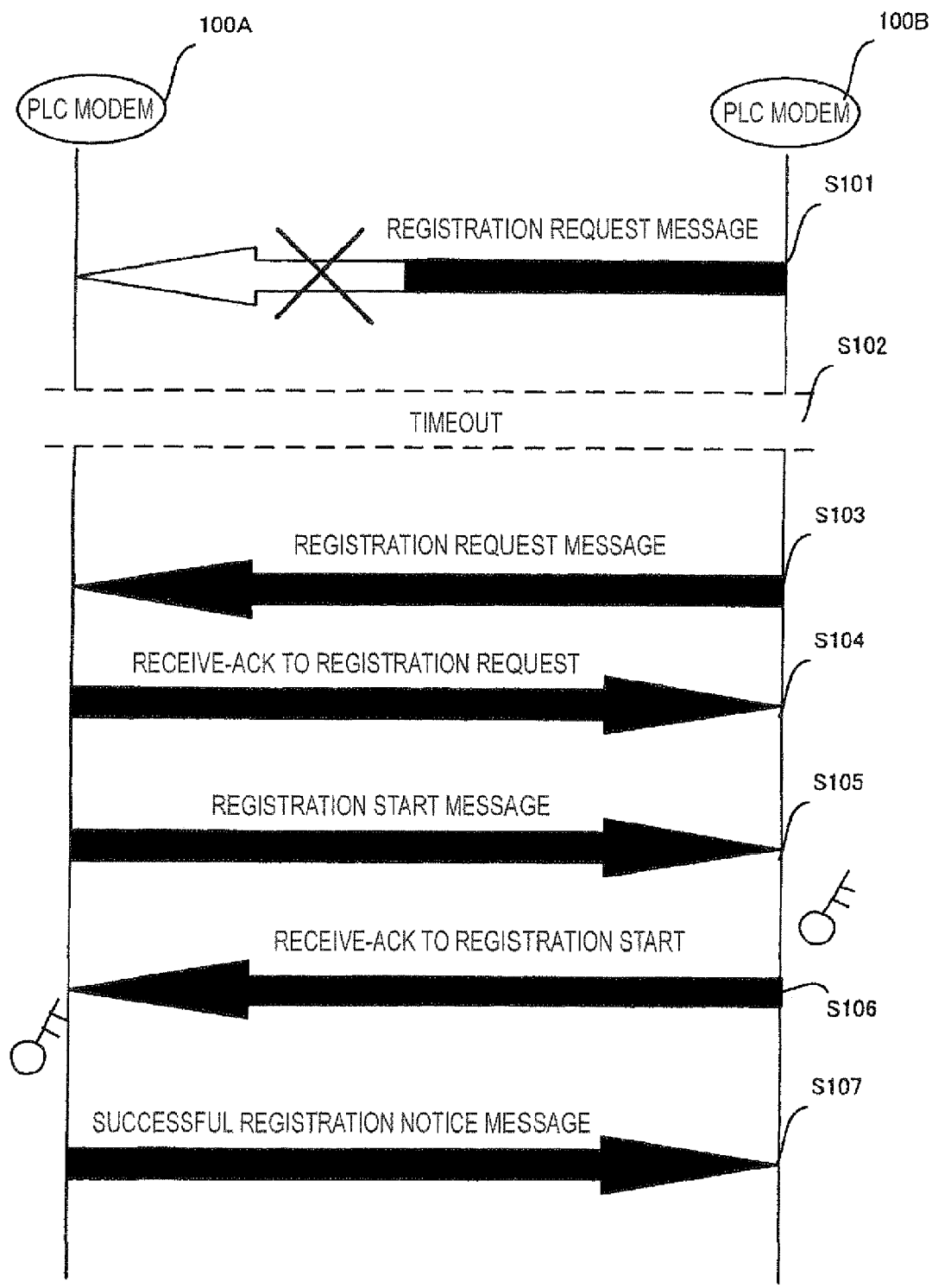
FIG. 6 shows an example of a first applied registration processing according to the embodiment of the present invention.

FIG. 6 shows an example of the first applied registration processing performed by the PLC modem 100. In particular, FIG. 6 shows a flow of data transmitted and received in the first applied registration processing. FIG. 6 provides a presumption that the PLC modem 100A has not received a registration request message from the PLC modem 100B. Further, when the controller 10 recognizes press of the setup button 106 of the PLC modem 100A, processing of the PLC modem 100A is started. When the controller 10 recognizes press of the setup button 106 of the PLC modem 100B, processing of the PLC modem 100B is started.

First, basic registration processing is commenced. Specifically, the PLC modem 100B transmits a registration request message (step S101). However, the PLC modem 100A is assumed to have failed to receive the registration request message because of an adverse communication environment where the first applied registration processing is to be performed and a short communicable distance. In this case, the PLC modem 100A cannot send a receive ACK responsive to the registration request message (step S102).

When a predetermined period of time (e.g., 10 seconds) has elapsed (timeout has arisen) since basic registration processing was started (i.e., press of the setup button 106 of the PLC modem 100B is recognized), the PLC modem 100B changes its own transmission parameters. In the meantime, when a predetermined period of time (e.g., 10 seconds) has elapsed (timeout has arisen) since basic registration processing was started (i.e., press of the setup button 106 of the PLC modem 100A is recognized), the PLC modem 100A changes its own transmission parameters.

When the transmission parameters are changed, the PLC modem 100A and the PLC modem 100B retry basic registration processing. In short, the PLC modem 100B retransmits the registration request message (step S103). The PLC modem 100A transmits a receive ACK responsive to the retransmitted registration request message (step S104). When the receive ACK message shows permission, the PLC modem 100A transmits a registration start message to the PLC modem 100B (step S105), and the PLC modem 100B transmits a receive ACK responsive to a registration start message to the PLC modem 100A (step S106). When transmission of the registration start message and transmission of a receive ACK responsive to the registration start message are performed, various pieces of information (e.g., MAC addresses unique to the PLC modems, a random number acquired from a Time stamp, and the like), which are confidential between these PLC modems 100, are transmitted to each other. The PLC modem 100A and the PLC modem 100B generate a unique key from mutually-transmitted various pieces of information. The PLC modem 100A transmits a successful registration notice message to the PLC modem 100B (step S107).

In a communication environment where the first applied registration processing is performed, a communication characteristic is vulnerable to influence as a result of another electric appliance being connected to; for instance, the power line 700, and hence there is a potential risk of the communication characteristic being deteriorated at any timing in basic registration processing. Consequently, it sometimes becomes impossible to receive data at timing other than timing at which a registration request message is received. Receipt of data includes receiving operation performed by the PLC modem 100B, as well as including receiving operation performed by the PLC modem 100A. Even in such a case, it may also be possible to change the transmission parameters of the respective PLC modems after occurrence of timeout and to retry basic registration processing from the beginning or at any intermediate point. The case where basic registration processing is retry from an intermediate point means; for instance, a case where the PLC modem 100B has not received a receive ACK responsive to the registration request message from the PLC modem 100A and where basic registration processing is retry from the step of the PLC modem 100A transmitting the registration start message to the PLC modem 100B.

FIG. 6 shows transmission of the registration request message from the PLC modem 100B to the PLC modem 100A and transmission of the receive ACK responsive to the registration request message from the PLC modem 100A to the PLC modem 100B. However, the transmission request message may also be transmitted from the PLC modem 100A to the PLC modem 100B, and the receive ACK responsive to the registration request message may also be transmitted from the PLC modem 100B to the PLC modem 100A.

An example operation carried out when the PLC modem 100 performs the first applied registration processing will now be described.

Figure 7:
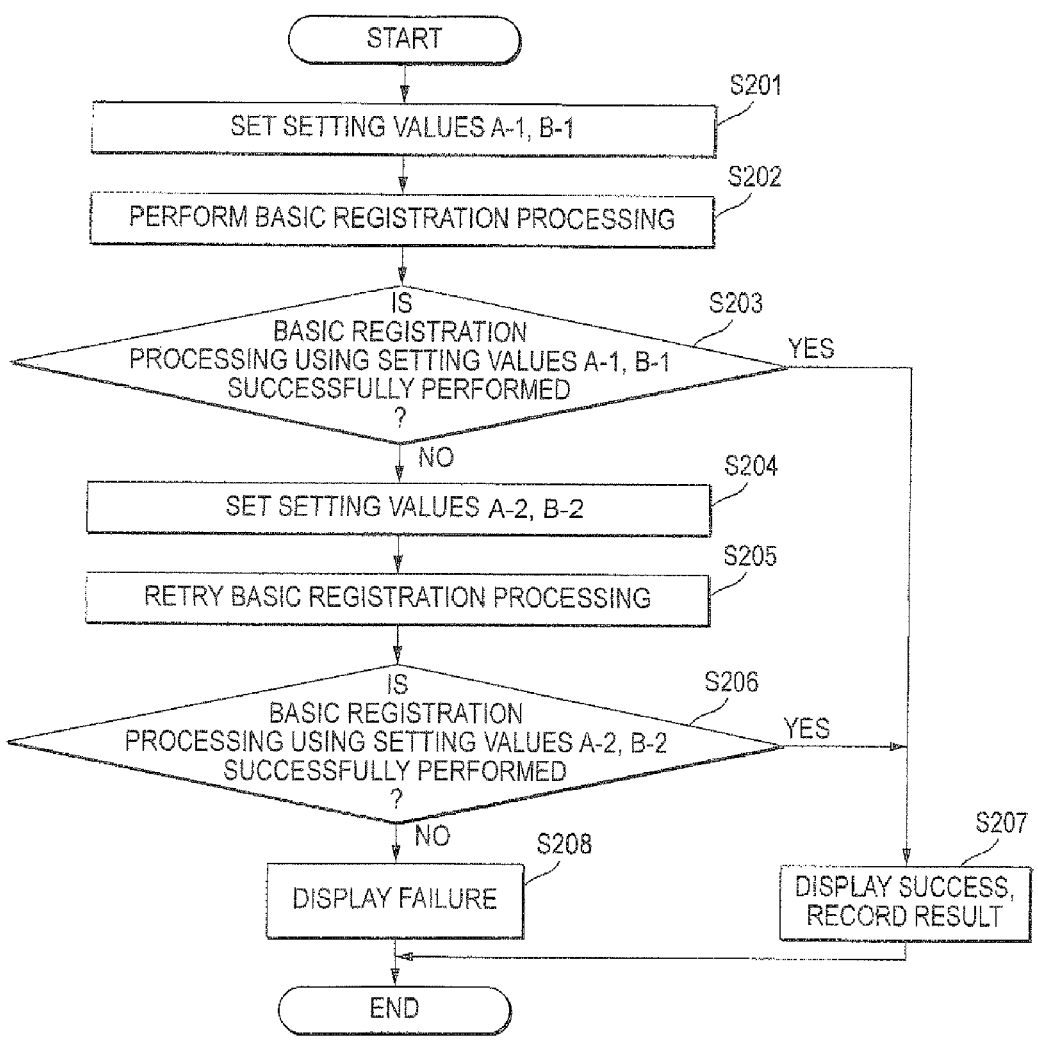
FIG. 7 is a flowchart showing an example of operation performed when the PLC modem according to the embodiment of the present invention performs the first applied registration processing.

FIG. 7 is a flowchart showing example operation performed when the PLC modem 100 performs the first applied registration processing. FIG. 7 shows an assumption that the transmission parameter (transmission power) described in connection with "A" and the parameter (the PAM value) described in connection with "B" are changed as shown in FIGS. 5A and 5B. Parameters other than these transmission parameters may also be presumed to be changed as shown in FIGS. 5C to 5F. Most preferably, transmission power and the PAM value are changed. Reference symbols (A-1, B-1) designate yet-to-be-changed transmission parameters for basic registration processing, and reference symbols (A-2, B-2) designate changed transmission parameters for basic registration processing.

The flowchart shown in FIG. 7 is a flowchart common between the PLC modem 100A serving as a master device and the PLC modem 100B serving as a slave device. It may also be the case where the PLC modem 100A will perform the first applied registration processing along with a PLC modem 100B (e.g., an unillustrated PLC modem 100B2) other than the PLC modem 100B (e.g., an unillustrated PLC modem 100B1) that is a target of the first applied registration processing. The first applied registration processing and basic registration processing shown in FIG. 7 are assumed to designate the first applied registration processing and basic registration processing of the PLC modem 100A and the predetermined PLC modem 100B.

In FIG. 7, when the controller 10 recognizes press of the setup button 106 of the PLC modem 10A, processing of the PLC modem 100A is commenced. When the controller 10 recognizes press of the setup button 106 of the PLC modem 100B, processing of the PLC modem 100B is initiated.

First, the controller 10 sets a setting value (A-1) and a setting value (B-1) of the transmission parameters in the setting register by reference to the storage 30 (step S201).

Subsequently, the controller 10 and the communicator 20 perform the basic registration processing by way of the other PLC modem 100, which is the target of the first applied registration processing, and the power line 700 (step S202). The controller 10 now generates transmission data from the setting values (the setting value (A-1) and the setting value (B-1) in the present embodiment) of the transmission parameters set in the setting register.

Subsequently, the controller 10 determines whether or not the basic registration processing using the setting value (A-1) and the setting value (B-1) as transmission parameters has been successfully performed, namely, whether or not the basic registration processing has been completed without involvement of a failure (step S203). When a timeout has arisen, the controller 10 determines that the basic registration processing ended in failure.

When the basic registration processing has ended in failure, the controller 10 sets setting values (A-2) and (B-2) of the transmission parameters in the setting register by reference to the storage 30 (step S204).

Subsequently, the controller 10 and the communicator 20 retry the basic registration processing from the beginning or an intermediate point (step S205). The controller 10 generates transmission data from the setting values (the setting value (A-2) and the setting value (B-2) in the present embodiment) of the transmission parameters set in the setting register.

The controller 10 subsequently determines whether or not the basic registration processing using the setting value (A-2) and the setting value (B-2) as transmission parameters; namely, retry the basic registration processing, has been successfully performed, or has been completed without involvement of a failure (step S206).

When the basic registration processing (including a retry of processing) has been successfully performed, the controller 10 causes the display section 105 to display information showing success of the basic registration processing, and a result of registration processing is stored in the storage 30 (step S207).

When the basic registration processing using the setting value (A-2) and the setting value (B-2) as transmission parameters; namely, retry the basic registration processing, has ended in failure, the controller 10 causes the display section 105 to display information showing a failure of the basic registration processing (step S208).

Although unillustrated, when the basic registration processing using the setting value (A-2) and the setting value (B-2) as transmission parameters; namely, retry the basic registration processing, has ended in failure, the basic registration processing may further be retried.

An example timing chart of the first applied registration processing will now be described.

FIGS. 8A and 8B show example timing charts of the first applied registration processing. FIGS. 8A and 8B show a change of at least a PAM value. In initial settings, both the PLC modem 100A and the PLC modem 100B assume 16 PAM. The timing chart is based on the presumption that a communication environment where the first applied registration processing is performed is comparatively poor and that a communicable distance is comparatively short.

FIG. 8A shows an assumption that the setup button 106 of the PLC modem 100B is pressed and that the setup button 106 of the PLC modem 100A is subsequently pressed within a predetermined period of time (or set time, e.g., five seconds). When the setup button 106 of the PLC modem 100A is not pressed within the predetermined period of time, the first applied registration processing is completed.

First, the PLC modem 100B recognizes the press of the setup button 106 of the PLC modem 100B at t=0.

Subsequently, the PLC modem 100A recognizes the press of the setup button 106 of the PLC modem 100A at t=4.5. Although the time of recognition is described as t=4.5 in the present embodiment, the essential requirement is that the press of the setup button 106 of the PLC modem 100A be recognized within a predetermined period of time (e.g., five seconds) after the press of the setup button 106 of the PLC modem 100B has been recognized. Therefore, no problem arises, so long as the period of time is; for instance, t<5. When the press of the setup buttons 106 of the PLC modem 100A and the PLC modem 100B are recognized, both the PLC modem 100A and the PLC modem 100B start the basic registration processing. The PLC modem 100B usually does not start the basic registration processing until a predetermined period of time (e.g., five seconds) elapses since press of the setup button 106 of the PLC modem 100B was recognized.

Subsequently, the basic registration processing of both the PLC modem 100A and the PLC modem 100B ends in failure at t=5.1. At this point in time, both the PLC modem 100A and the PLC modem 100B assume 16 PAM as a PAM value. A time t=5.1 is illustrative.

Subsequently, the PLC modem 100B changes a transmission parameter at t=11; for example, a change is made to the PAM value from 16 PAM to 8 PAM. The transmission parameter is changed when a predetermined period of time (e.g., 10 seconds: at a point in time t=10) has elapsed (occurrence of timeout) after the press of the setup button 106 of the PLC modem 100B has been recognized. Here, a time t=11 is illustrative.

The basic registration processing of both the PLC modem 100A and the PLC modem 100B end in failure at t=11.5. At this point in time, the PAM value of the PLC modem 100A is 16 PAM, and the PAM value of the PLC modem 100B is 8 PAM. Communication of data from the PLC modem 100B to the PLC modem 100A is successful, but communication of data from the PLC modem 100A to the PLC modem 100B ends in failure. As a consequence, the basic registration processing ends in failure. A time t=11.5 is illustrative.

Subsequently, the PLC modem 100A changes the transmission parameters at t=15.5; for instance, the PAM value from 16 PAM to 8 PAM. The transmission parameters are changed when a predetermined period of time (e.g., 10 seconds; at a point in time t=14.5) has elapsed (occurrence of timeout) after the press of the setup button 106 of the PLC modem 100A has been recognized. A time t=15.5 is illustrative.

The basic registration processing of the PLC modem 100A and the PLC modem 100B is successfully performed at t=16. Both the PLC modem 100A and the PLC modem 100B assume 8 PAM as a PAM value at this point in time. A time t=16 is illustrative.

Next, FIG. 8B shows an assumption that the setup button 106 of the PLC modem 100A is pressed and that the setup button 106 of the PLC modem 100B is subsequently pressed within a predetermined period of time (e.g., five seconds). When the setup button 106 of the PLC modem 100B is not pressed within the predetermined period of time, the first applied registration processing is completed.

First, the PLC modem 100A recognizes the press of the setup button 106 of the PLC modem 100A at t=0.

Subsequently, the PLC modem 100B recognizes the press of the setup button 106 of the PLC modem 100B at t=4.5. Although the time of recognition is described as t=4.5 in the present embodiment, the essential requirement is that the press of the setup button 106 of the PLC modem 100B be recognized within a predetermined period of time (e.g., five seconds) after the press of the setup button 106 of the PLC modem 100A has been recognized. No problem arises, so long as the period of time is; for instance, t<5. When the PLC modem 100A and the PLC modem 100B recognize the press of the setup buttons 106, both the PLC modem 100A and the PLC modem 100B start the basic registration processing. The PLC modem 100B does not start the basic registration processing until a predetermined period of time (e.g., five seconds) elapses since press of the setup button 106 of the PLC modem 100B was recognized.

Subsequently, the basic registration processing of both the PLC modem 100A and the PLC modem 100B ends in failure at t=9.9. At this point in time, both the PLC modem 100A and the PLC modem 100B assume 16 PAM as a PAM value. A time t=9.9 is illustrative, and no problem arises so long as t<10 is fulfilled.

Subsequently, the PLC modem 100A changes a transmission parameter at t=11; for example, a change is made to the PAM value from 16 PAM to 8 PAM. The transmission parameter is changed when a predetermined period of time (e.g., 10 seconds; at a point in time t=10) has elapsed (occurrence of timeout) after the press of the setup button 106 of the PLC modem 100A has been recognized. Here, a time t=11 is illustrative.

The basic registration processing of both the PLC modem 100A and the PLC modem 100B end in failure at t=11.5. At this point in time, the PAM value of the PLC modem 100B is 16 PAM, and the PAM value of the PLC modem 100A is 8 PAM. Communication of data from the PLC modem 100A to the PLC modem 100B is successful, but communication of data from the PLC modem 100B to the PLC modem 100A ends in failure. As a consequence, the basic registration processing ends in failure. A time t=11.5 is illustrative.

Subsequently, the PLC modem 100B changes the transmission parameters at t=15.5; for instance, the PAM from 16 PAM to 8 PAM. The transmission parameters are changed when a predetermined period of time (e.g., 10 seconds; at a point in time t=14.5) has elapsed after the press of the setup button 106 of the PLC modem 100B has been recognized. A time t=15.5 is illustrative.

The basic registration processing of the PLC modem 100A and the PLC modem 100B is successfully performed at t=16. Both the PLC modem 100A and the PLC modem 100B assume 8 PAM as a PAM value at this point in time. A time t=16 is illustrative.

As mentioned above, according to the first applied registration processing, even when a plurality of PLC modems 100 are connected to the power line 700, registration processing can be reliably performed between desired PLC modems 100. Desired registration processing can be performed without imposing load on the PLC modems 100 because there is no necessity for transmitting and receiving new data (a mode change notice) as in the second applied registration processing to be described later.

(Second Applied Registration Processing)

In the second applied registration processing, when the PLC modem 100 determines that performance of the basic registration processing ended in failure, the transmission parameters are changed. Moreover, a transmission mode change notice is made. Upon receipt of the mode change notice, the other PLC modem 100 serving as a partner of the second applied registration processing changes the transmission parameters in accordance with the mode change notice. Subsequently, all or a part of the basic registration processing operations is again carried out by use of the thus-changed transmission parameters.

Figure 9:
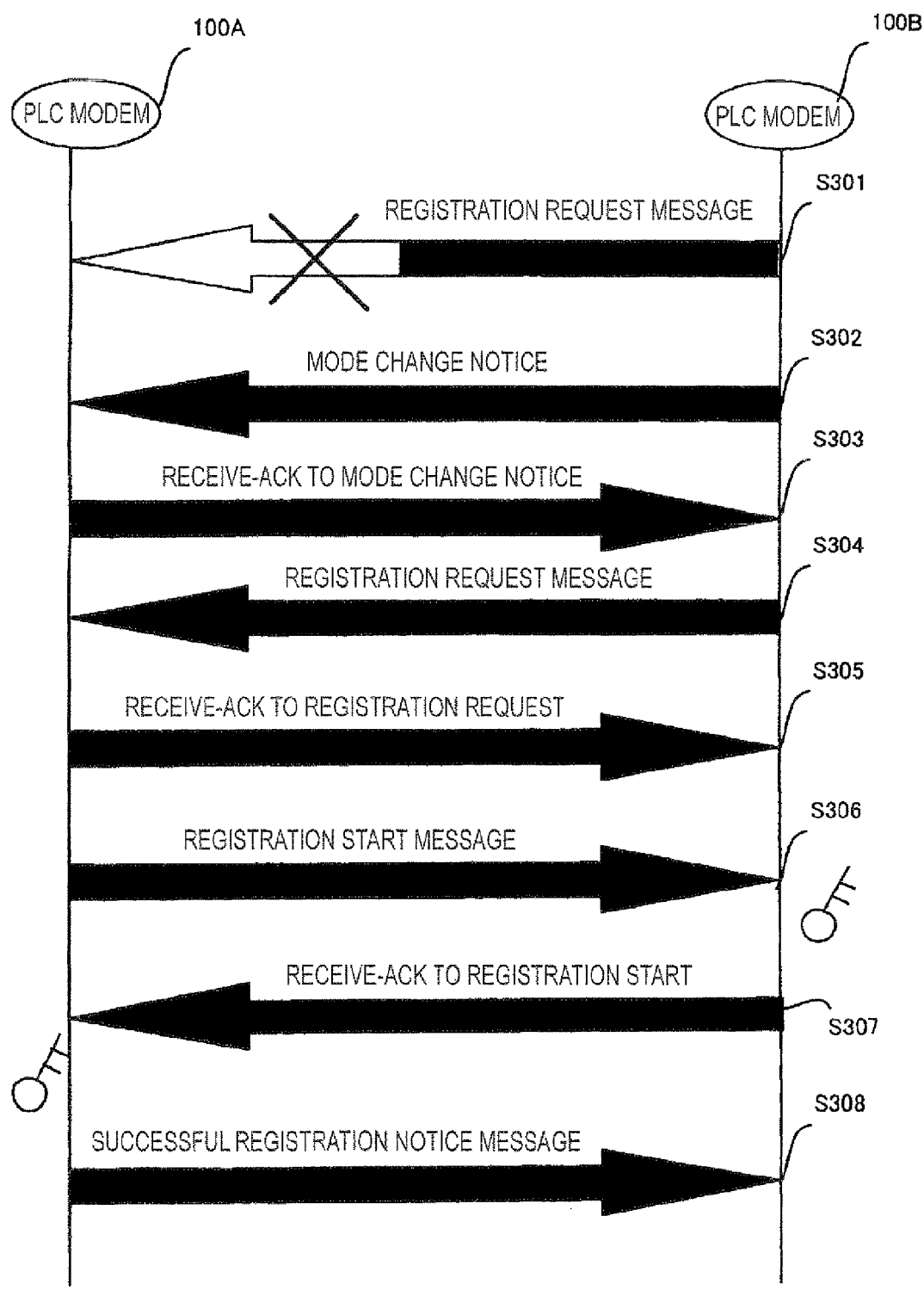
FIG. 9 shows an example of a second applied registration processing according to the embodiment of the present invention.

FIG. 9 shows an example of the second applied registration processing performed by the PLC modem 100. In particular, FIG. 9 shows a flow of data transmitted and received in the second applied registration processing. FIG. 9 shows an assumption that the PLC modem 100A has not received a registration request message from the PLC modem 100B. Further, when the controller 10 recognizes press of the setup button 106 of the PLC modem 100A, processing of the PLC modem 100A is started. When the controller 10 recognizes press of the setup button 106 of the PLC modem 100B, processing of the PLC modem 100B is started.

First, the basic registration processing is commenced. Specifically, the PLC modem 100B transmits a registration request message (step S301). However, the PLC modem 100A is assumed to have failed to receive the registration request message because of an adverse communication environment where the second applied registration processing is to be performed and a short communicable distance. In this case, the PLC modem 100A cannot send a receive ACK responsive to the registration request message.

When a predetermined period of time (or set time, e.g., five seconds) has elapsed since the basic registration processing was started (i.e., press of the setup button 106 of the PLC modem 100B is recognized), the PLC modem 100B transmits a mode change notice (step S302). In the meantime, when the predetermined period of time has elapsed, the PLC modem 100B changes its own transmission parameters. The predetermined period of time is shorter than the predetermined period of time described as a time for timeout in the first applied registration processing.

Upon receipt of the mode change notice, the PLC modem 100A transmits a receive ACK responsive to the mode change notice (step S303). In accordance with information about changes in transmission parameters included in the mode change notice, the PLC modem 100A can change transmission parameters of the PLC modem 100B.

Upon receipt of the receive ACK responsive to the mode change notice, the PLC modem 100B retries the basic registration processing by use of the changed transmission parameters. In short, upon receipt of the receive ACK responsive to the mode change notice, the PLC modem 100B retransmits the registration request message (step S304). The PLC modem 100A transmits a receive ACK responsive to the retransmitted registration request message (step S305). When the receive ACK message shows permission, the PLC modem 100A transmits a registration start message to the PLC modem 100B (step S306), and the PLC modem 100B transmits a receive ACK responsive to a registration start message to the PLC modem 100A (step S307). When transmission of the registration start message and transmission of a receive ACK responsive to the registration start message are performed, various pieces of information (e.g., MAC addresses unique to the PLC modems, a random number acquired from a Time stamp, and the like), which are confidential between these PLC modems 100, are transmitted to each other. The PLC modem 100A and the PLC modem 100B generate a unique key from mutually transmitted various pieces of information. The PLC modem 100A transmits a successful registration notice message to the PLC modem 100B (step S308).

In a communication environment where the second applied registration processing is performed, a communication characteristic is vulnerable to influence as a result of another electric appliance being connected to; for instance, the power line 700, and hence there is a potential risk of the communication characteristic being deteriorated at any timing in the basic registration processing. Consequently, it sometimes becomes impossible to receive data at timing other than timing at which a registration request message is received. Receiving operation includes receiving operation performed by the PLC modem 100B, as well as including receiving operation performed by the PLC modem 100A. Even in such a case, it may also be possible to retry the basic registration processing from the beginning or an intermediate point by causing the PLC modem 100 transmitted the unreceived data to send a mode change notice and causing the PLC modem 100, which has failed to receive data, to send a receive ACK responsive to the mode change notice. The case where the basic registration processing is retry from an intermediate point means; for instance, a case where the PLC modem 100B has not received a receive ACK responsive to the registration request message from the PLC modem 100 and where the basic registration processing is retry from the step of the PLC modem 100A transmitting the registration start message to the PLC modem 100B.

FIG. 9 shows transmission of the registration request message from the PLC modem 100B to the PLC modem 100A and transmission of the receive ACK responsive to the registration request message from the PLC modem 100A to the PLC modem 100B. Alternatively, the registration request message may also be transmitted from the PLC modem 100A to the PLC modem 100B, and the receive ACK responsive to the registration request message may also be transmitted from the PLC modem 100B to the PLC modem 100A.

An example operation carried out when the PLC modem 100B performs the second applied registration processing will now be described.

In the second applied registration processing, operation of the PLC modem 100 changes according to whether the setup button 106 of the PLC modem 100B is pressed faster than is the setup button 106 of the PLC modem 100A or the setup button 106 of the PLC modem 100B is pressed faster than is the setup button 106 of the PLC modem 100A. Operations of the PLC modems 100 performed in the former case are called first operations, and operations of the PLC modems 100 performed in the latter case are called second operations. Moreover, in the second applied registration processing, operation of the PLC modem 100A differs from operation of the PLC modem 100B.

First operation of the second applied registration processing is now described.

Figure 10:
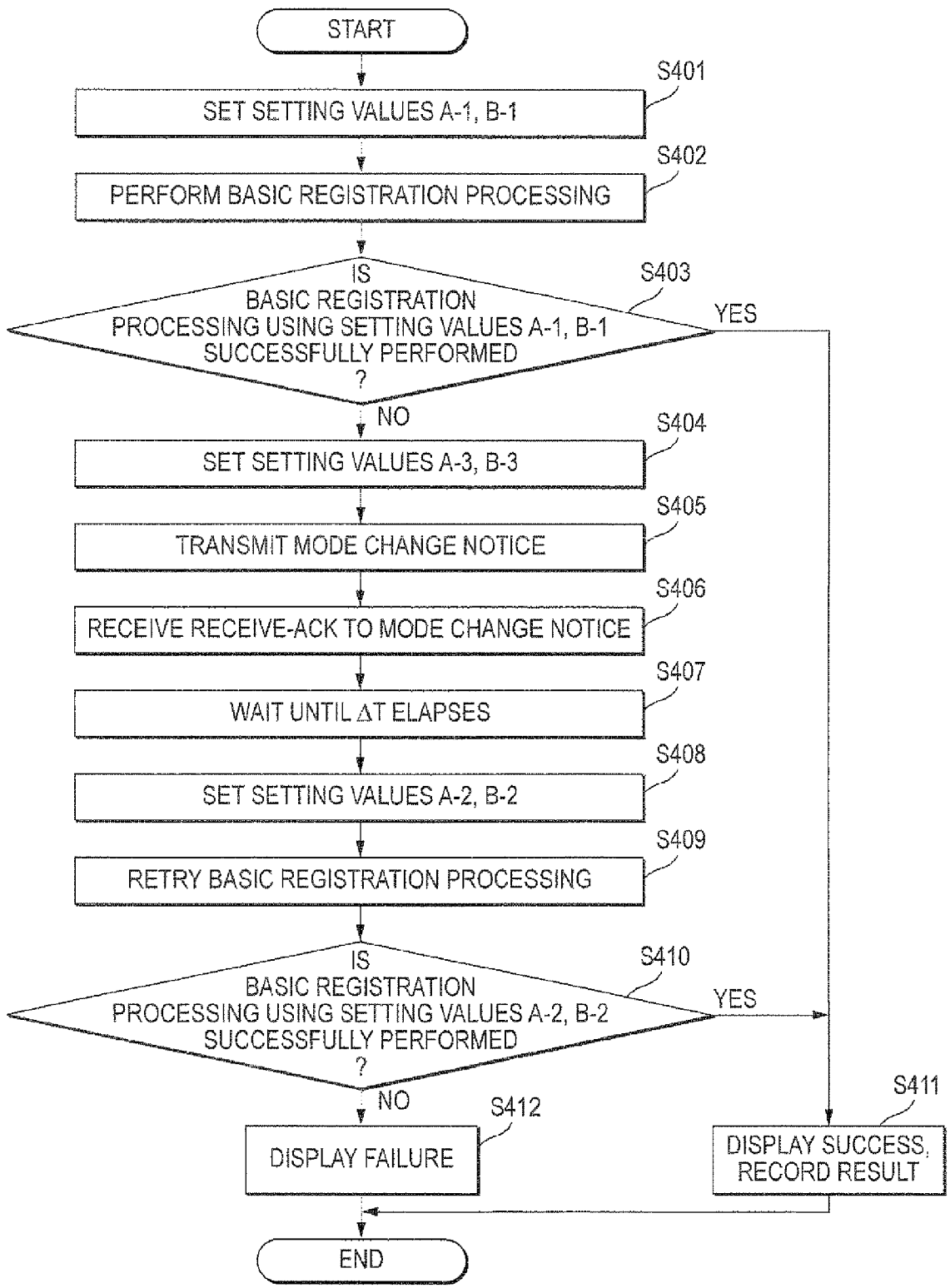
FIG. 10 is a flowchart showing an example of a first operation performed when a PLC modem acting as a slave device according to the embodiment of the present invention carries out the second applied registration processing.

FIG. 10 is a flowchart showing example first operation carried out when the PLC modem 100B performs the second applied registration processing. FIG. 10 shows an assumption that the transmission parameter (transmission power) described in connection with "A" and the parameter (the PAM value) described in connection with "B" are changed as shown in FIG. 5A or 5B. Parameters other than these transmission parameters may also be presumed to be changed as shown in FIGS. 5C to 5F. Most preferably, transmission power and the PAM value are changed. Reference symbols (A-1, B-1) designate yet-to-be-changed transmission parameters for the basic registration processing, and reference symbols (A-2, B-2) designate changed transmission parameters for the basic registration processing.

The PLC modem 100A often performs applied registration processing along with another PLC modem 100B (e.g., an unillustrated PLC modem 100B2) other than a PLC modem 100B (e.g., an unillustrated PLC modem 100B1) that is a target of applied registration processing. Applied registration processing and the basic registration processing shown in FIG. 10 represent applied registration processing and the basic registration processing performed between the PLC modem 100A and the predetermined PLC modem 100B. In a wait time ΔT provided in connection with S407, receipt of a request is waited with the setting values (A-1, B-1), and hence a registration request from a PLC modem other than the PLC modem 100A and the PLC modem 100B can be received. However, when receipt of a plurality of registration requests is detected during a given period of time, registration is brought in failure, thereby making it possible to prevent erroneous registration by a neighborhood or a malicious person who attempts registration.

In FIG. 10, when the controller 10 recognizes press of the setup button 106 of the PLC modem 100A, processing of the PLC modem 100A is commenced. When the controller 10 recognizes press of the setup button 106 of the PLC modem 100B, processing of the PLC modem 100B is initiated.

First, the controller 10 sets a setting value (A-1) and a setting value (B-1) of the transmission parameters in the setting register by reference to the storage 30 (step S401).

Subsequently, the controller 10 and the communicator 20 perform the basic registration processing by way of the PLC modem 100A, which is the target of the second applied registration processing, and the power line 700 (step S402). The controller 10 generates transmission data from the setting values (the setting value (A-1) and the setting value (B-1) in the present embodiment) of the transmission parameters set in the setting register.

Subsequently, the controller 10 determines whether or not the basic registration processing using the setting value (A-1)

and the setting value (B-1) as transmission parameters has been successfully performed; namely, whether or not the basic registration processing has been completed without involvement of a failure (step S403). For instance, when a predetermined period of time of order of five seconds has elapsed since the press of the setup button 106 of the PLC modem 100B was recognized, the controller 10 determines that the basic registration processing ended in failure. The predetermined period of time is shorter than the predetermined period of time described as a time of timeout in the first applied connection processing.

Subsequently, the controller 10 sets setting values (A-3) and (B-3) of the transmission parameters in the setting register (step S404). When a communication channel for the transmission parameters (A-3, B-3) and a communication channel for the transmission parameters (A-1, B-1) and (A-2, B-2) can be simultaneously assured, the transmission parameters (A-3, B-3) may also be set in a processing start stage.

The communicator 20 transmits a mode change notice (step S405). At this time, the controller 10 generates a mode change notice in accordance with the setting values (A-3) and (B-3).

When the communicator 20 has received a receive ACK responsive to the mode change notice (step S406), the controller 10 reads change information including information about a time ($\Delta T$) from when the PLC modem 100A receives the receive ACK until when the PLC modem 100A undergoes timeout. Change information is included in the receive ACK.

The controller 10 then waits until $\Delta T$ elapses (step S407). During the wait time, the PLC modem 100B interrupts performance of the basic connection processing.

The controller 10 next sets the setting values (A-2) and (B-2) of the transmission parameters in the setting register by reference to the storage 30 (step S408).

Subsequently, the controller 10 and the communicator 20 retry the basic registration processing from the beginning or an intermediate point (step S409). The controller 10 generates transmission data from the setting values (the setting value (A-2) and the setting value (B-2) in the present embodiment) of the transmission parameters set in the setting register.

The controller 10 subsequently determines whether or not the basic registration processing using the setting value (A-2) and the setting value (B-2) as transmission parameters; namely, retry the basic registration processing, has been successfully performed, or has been completed without involvement of a failure (step S410).

When the basic registration processing (including a retry of processing) has been successfully performed, the controller 10 causes the display section 105 to display information showing success of the basic registration processing, and a result of registration processing is stored in the storage 30 (step S411).

When the basic registration processing using the setting value (A-2) and the setting value (B-2) as transmission parameters; namely, retry the basic registration processing, has ended in failure, the controller 10 causes the display section 105 to display information showing a failure of the basic registration processing (step S412).

Although unillustrated, when the basic registration processing using the setting value (A-2) and the setting value (B-2) as transmission parameters; namely, retry the basic registration processing, has ended in failure, the basic registration processing may further be retry.

Figure 11:
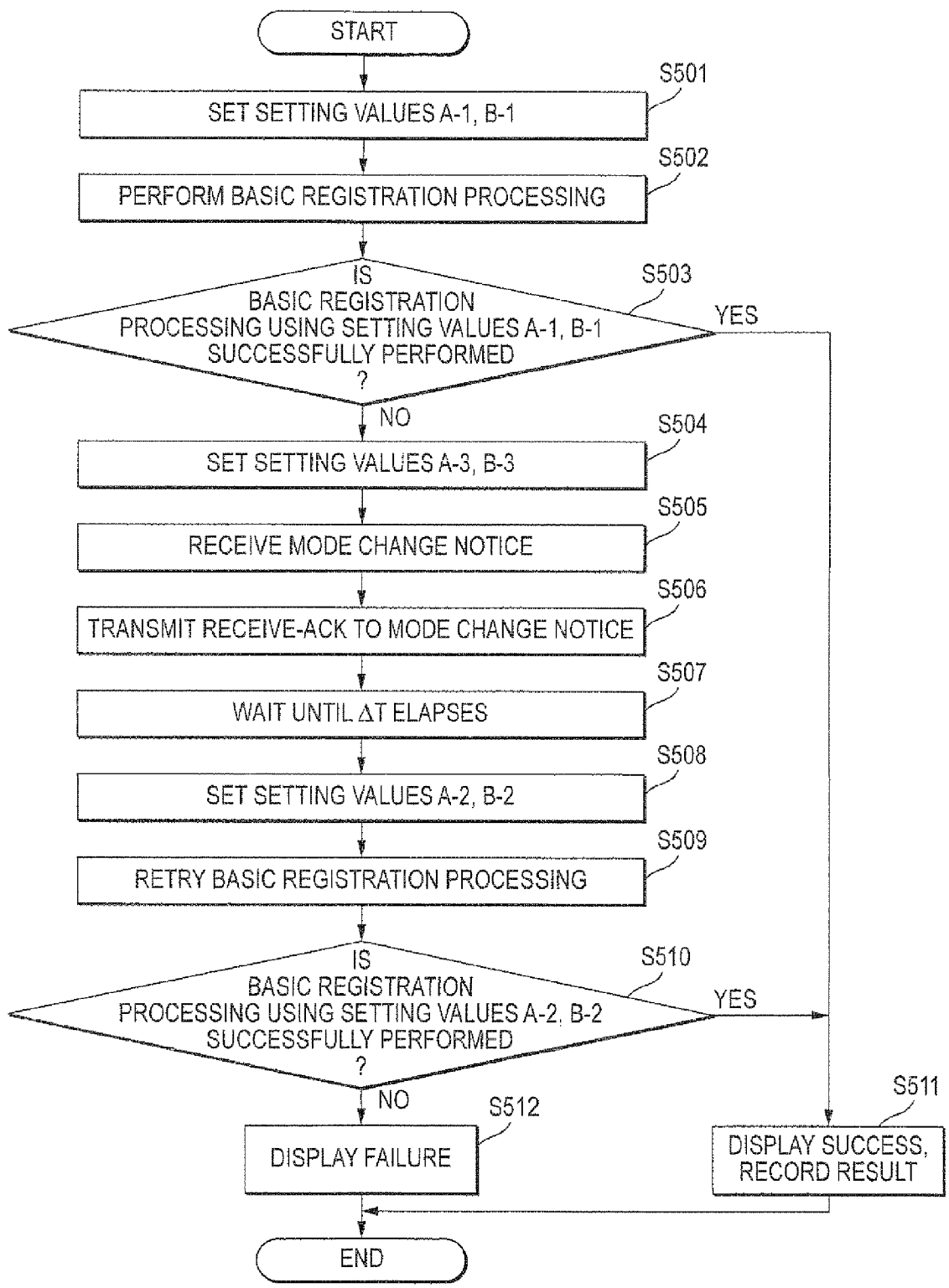
FIG. 11 is a flowchart showing an example of the first operation performed when a PLC modem acting as a master device according to the embodiment of the present invention carries out the second applied registration processing.

FIG. 11 is a flowchart showing example first operation performed when the PLC modem 100A performs the second applied registration processing. FIG. 11 shows an assumption that the transmission parameter (transmission power) described in connection with "A" and the parameter (the PAM value) described in connection with "B" are changed as shown in FIG. 5. Parameters other than these transmission parameters may also be presumed to be changed as shown in FIG. 5. Most preferably, transmission power and the PAM value are changed. Reference symbols (A-1, B-1) designate yet-to-be-changed transmission parameters for the basic registration processing, and reference symbols (A-2, B-2) designate changed transmission parameters for the basic registration processing.

The PLC modem 100A often performs applied registration processing along with another PLC modem 100B (e.g., the unillustrated PLC modem 100B2) other than a PLC modem 100B (e.g., the unillustrated PLC modem 100B1) that is a target of the second applied registration processing. Applied registration processing and the basic registration processing shown in FIG. 11 represent applied registration processing and the basic registration processing performed between the PLC modem 100A and the predetermined PLC modem 100B.

In FIG. 11, when the controller 10 recognizes press of the setup button 106 of the PLC modem 100A, processing of the PLC modem 100A is commenced. When the controller 10 recognizes press of the setup button 106 of the PLC modem 100B, processing of the PLC modem 100B is initiated.

First, the controller 10 sets a setting value (A-1) and a setting value (B-1) of the transmission parameters in the setting register by reference to the storage 30 (step S501).

Subsequently, the controller 10 and the communicator 20 perform the basic registration processing by way of the PLC modem 100B, which is the target of the second applied registration processing, and the power line 700 (step S502). The controller 10 generates transmission data from the setting values (the setting value (A-1) and the setting value (B-1) in the present embodiment) of the transmission parameters set in the setting register.

Subsequently, the controller 10 determines whether or not the basic registration processing using the setting value (A-1) and the setting value (B-1) as transmission parameters has been successfully performed; namely, whether or not the basic registration processing has been completed without involvement of a failure (step S503). For instance, when a predetermined period of time of order of 10 seconds has elapsed (timeout has occurred) since the press of the setup button 106 of the PLC modem 100A was recognized, the controller 10 determines that the basic registration processing ended in failure.

Subsequently, the controller 10 sets setting values (A-3) and (B-3) of the transmission parameters in the setting register (step S504). (A-3) and (B-3) are previously-described setting values for communication control.

The communicator 20 subsequently receives a mode change notice (step S505).

Steps S504 and S505 are not in particular order

The communicator 20 transmits a receive ACK responsive to the mode change notice in accordance with the setting values (A-3) and (B-3) (step S506). At this time, the controller 10 inserts into the receive ACK change information including information about a time ($\Delta T$) from when the receive ACK is received until when the PLC modem 100A undergoes timeout.

The controller 10 then waits until $\Delta T$ elapses (step S507). During the wait time, the PLC modem 100A interrupts performance of the basic registration processing with the PLC modem 100B.

The controller 10 sets the setting values (A-2) and (B-2) of the transmission parameters in the setting register by reference to the storage 30 (step S508).

Subsequently, the controller 10 and the communicator 20 retry the basic registration processing from the beginning or an intermediate point (step S509). The controller 10 generates transmission data from the setting values (the setting value (A-2) and the setting value (B-2) in the present embodiment) of the transmission parameters set in the setting register.

The controller 10 subsequently determines whether or not the basic registration processing using the setting value (A-2) and the setting value (B-2) as transmission parameters; namely, retry the basic registration processing, has been successfully performed, or has been completed without involvement of a failure (step S510).

When the basic registration processing (including a retry of processing) has been successfully performed, the controller 10 causes the display section 105 to display information showing success of the basic registration processing, and a result of registration processing is stored in the storage 30 (step S511).

When the basic registration processing using the setting value (A-2) and the setting value (B-2) as transmission parameters; namely, retry the basic registration processing, has ended in failure, the controller 10 causes the display section 105 to display information showing a failure of the basic registration processing (step S512).

Although unillustrated, when the basic registration processing using the setting value (A-2) and the setting value (B-2) as transmission parameters; namely, retry the basic registration processing, has ended in failure, the basic registration processing may further be retry.

An example timing chart employed when the PLC modem 100 performs first operation of the second applied registration processing will now be described.

Figure 14:
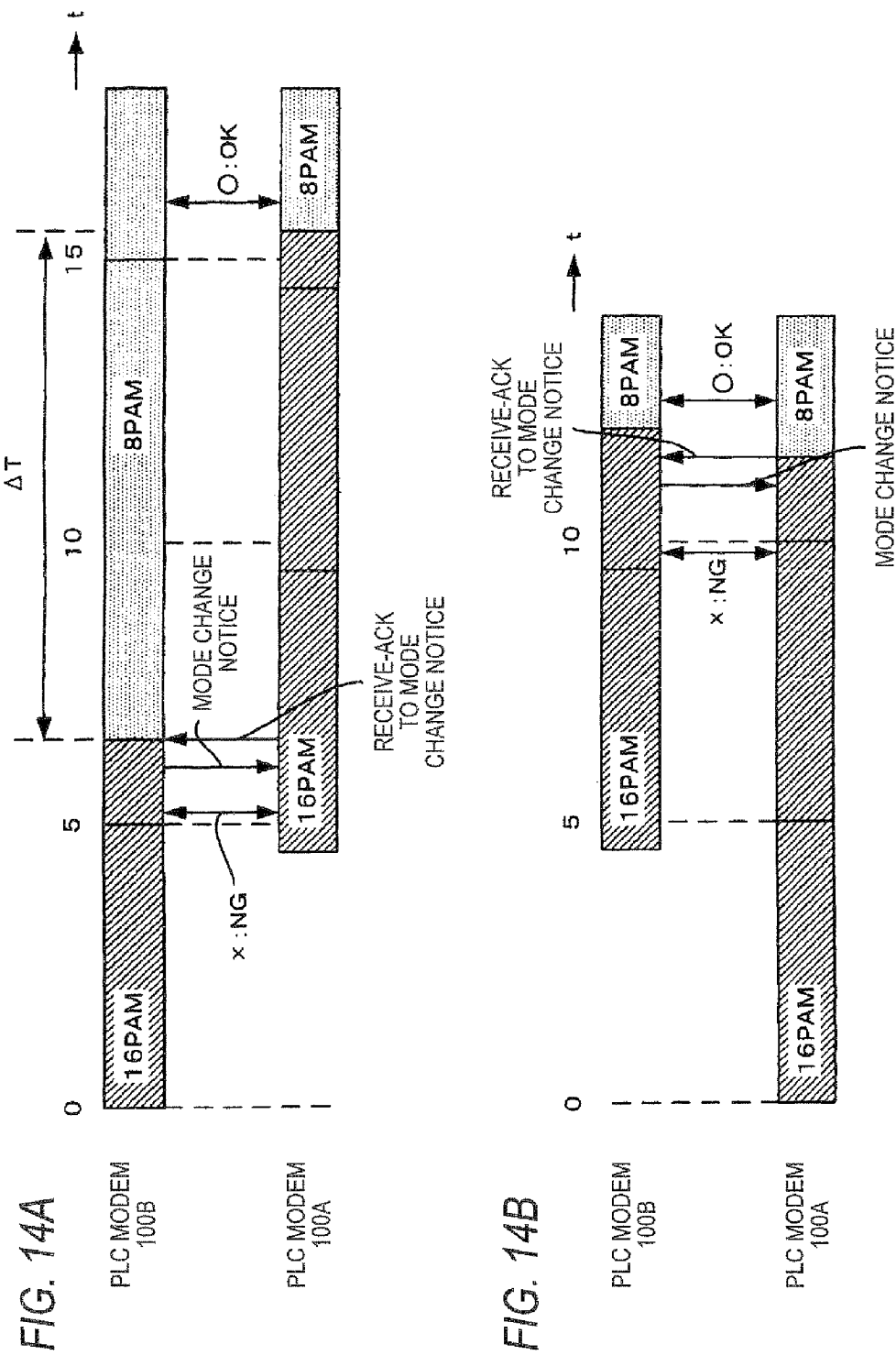
FIGS. 14A and 14B show example timing charts for the second applied registration processing according to the embodiment of the present invention.
Figure 15:
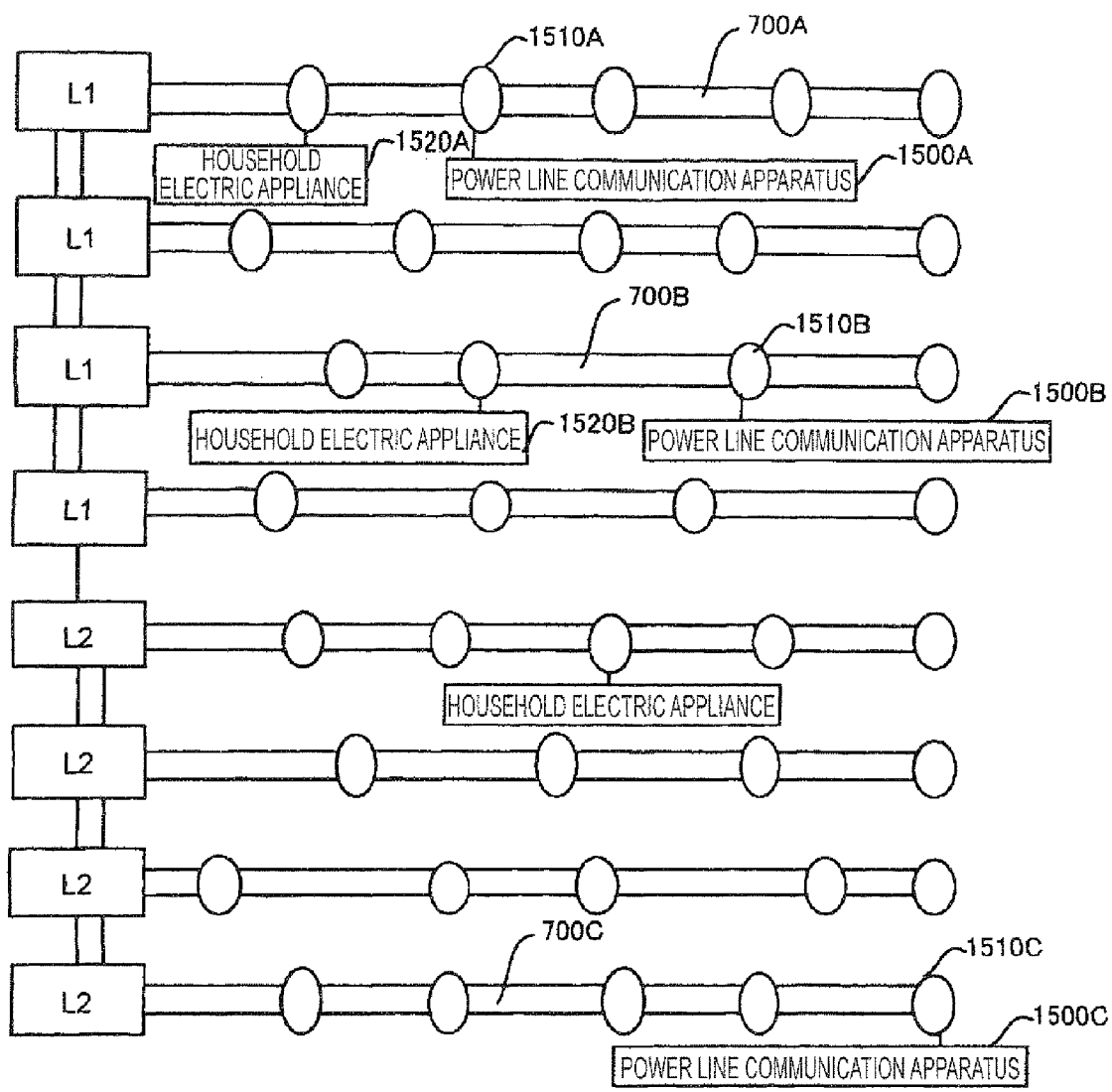
FIG. 15 shows an example communication environment for a power line communication apparatus.
Figure 16:
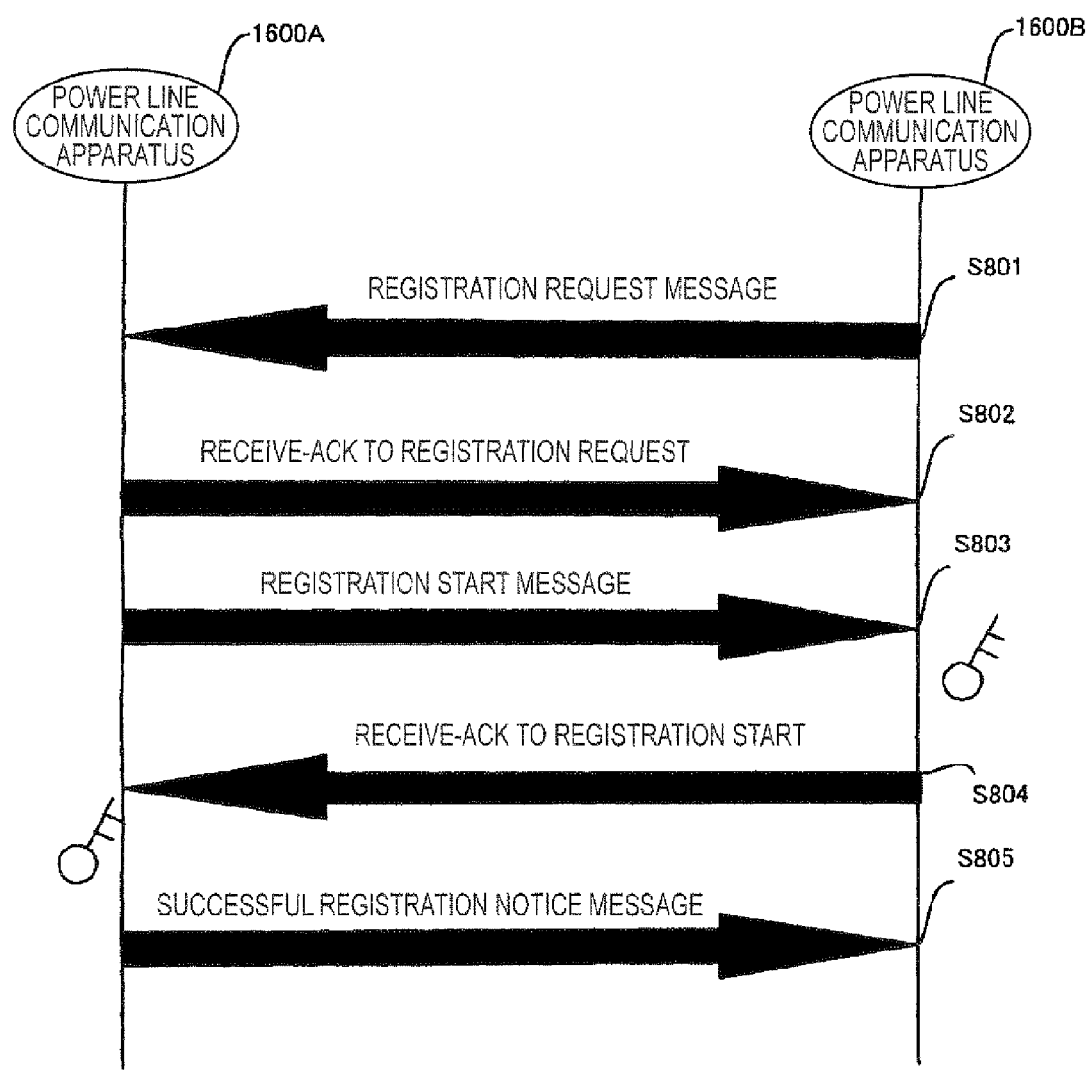
FIG. 16 shows an example of related-art registration processing.

FIG. 14A shows an example timing chart of first operation of the second applied registration processing. FIG. 14A shows a change of at least a PAM value. In initial settings, both the PLC modem 100A and the PLC modem 100B assume 16 PAM. The timing chart is based on the presumption that a communication environment where the second applied registration processing is performed is comparatively poor and that a communicable distance is comparatively short.

FIG. 14A shows an assumption that the setup button 106 of the PLC modem 100B is pressed and that the setup button 106 of the PLC modem 100A is subsequently pressed within a predetermined period of time (e.g., five seconds). When the setup button 106 of the PLC modem 100A is not pressed within the predetermined period of time, the second applied registration processing is completed.

First, the PLC modem 100B recognizes the press of the setup button 106 of the PLC modem 100B at t=0.

Subsequently, the PLC modem 100A recognizes the press of the setup button 106 of the PLC modem 100A at t=4.5. Although the time of recognition is described as t=4.5 in the present embodiment, the essential requirement is that the press of the setup button 106 of the PLC modem 100A be recognized within a predetermined period of time (e.g., five seconds) after the press of the setup button 106 of the PLC modem 100B has been recognized. Therefore, no problem arises, so long as the period of time is; for instance, t<5. When the press of the setup buttons 106 of the PLC modem 100A and the PLC modem 100B are recognized, both the PLC modem 100A and the PLC modem 100B start the basic registration processing. The PLC modem 100B usually does not start the basic registration processing until a predetermined period of time (e.g., five seconds) elapses since press of the setup button 106 of the PLC modem 100B was recognized.

Subsequently, the basic registration processing of both the PLC modem 100A and the PLC modem 100B ends in failure at t=5.1. At this point in time, both the PLC modem 100A and the PLC modem 100B assume 16 PAM as a PAM value. A time t=5.1 is illustrative.

Subsequently, the PLC modem 100B transmits a mode change notice to the PLC modem 10A at t=6. Although the time t=6 is adopted herein, another timing may also be adopted, so long as the timing comes after the PLC modem 100B recognizes a failure of the basic registration processing.

The PLC modem 100A then transmits a receive ACK responsive to the mode change notice to the PLC modem 100B at t=6.5. Although a time t=6.5 is adopted herein, another timing may also be adopted, so long as the timing comes after receipt of the mode change notice. Transmission is usually performed within one second after receipt of the mode change notice.

The PLC modem 100B changes a transmission parameter at t=6.5. For instance, the PAM value is changed from 16 PAM to 8 PAM. The transmission parameters are changed when a predetermined period of time (e.g. five seconds: at a point in time of t=5) elapses since the press of the setup button 106 of the PLC modem 100B was recognized. A time t=6.5 is illustrative.

Subsequently the PLC modem 100A changes the transmission parameters at t=15.5; for instance, the PAM value from 16 PAM to 8 PAM. The transmission parameters are changed when a predetermined period of time (e.g., 10 seconds, at a point in time t=14.5) has elapsed (occurrence of timeout) after the press of the setup button 106 of the PLC modem 100A has been recognized. A time t=15.5 is illustrative.

The PLC modem 100B recognizes at t=15.5 elapse of ΔT since the receive ACK responsive to the mode change notice from the PLC modem 100A was received (occurrence of timeout). Information about ΔT is included as change information in the receive ACK.

The basic registration processing of the PLC modem 100A and the PLC modem 100B is successfully performed at t=16. Both the PLC modem 100A and the PLC modem 100B assume 8 PAM as a PAM value at this point in time. A time t=16 is illustrative.

As mentioned above, according to first operation of the second applied registration processing, even when a plurality of PLC modems 100 are connected to the power line 700, registration processing can be reliably performed between desired PLC modems 100. For instance, during a period of t=6.5 to 15.5 shown in FIG. 14A, the PLC modem 100A and the PLC modem 100B stay in a waiting condition without performance of the basic registration processing, hence, occurrence of a useless failure is prevented, and load on the PLC modems 100 are lessened.

Next, second operation of the second applied registration processing is described.

Figure 12:
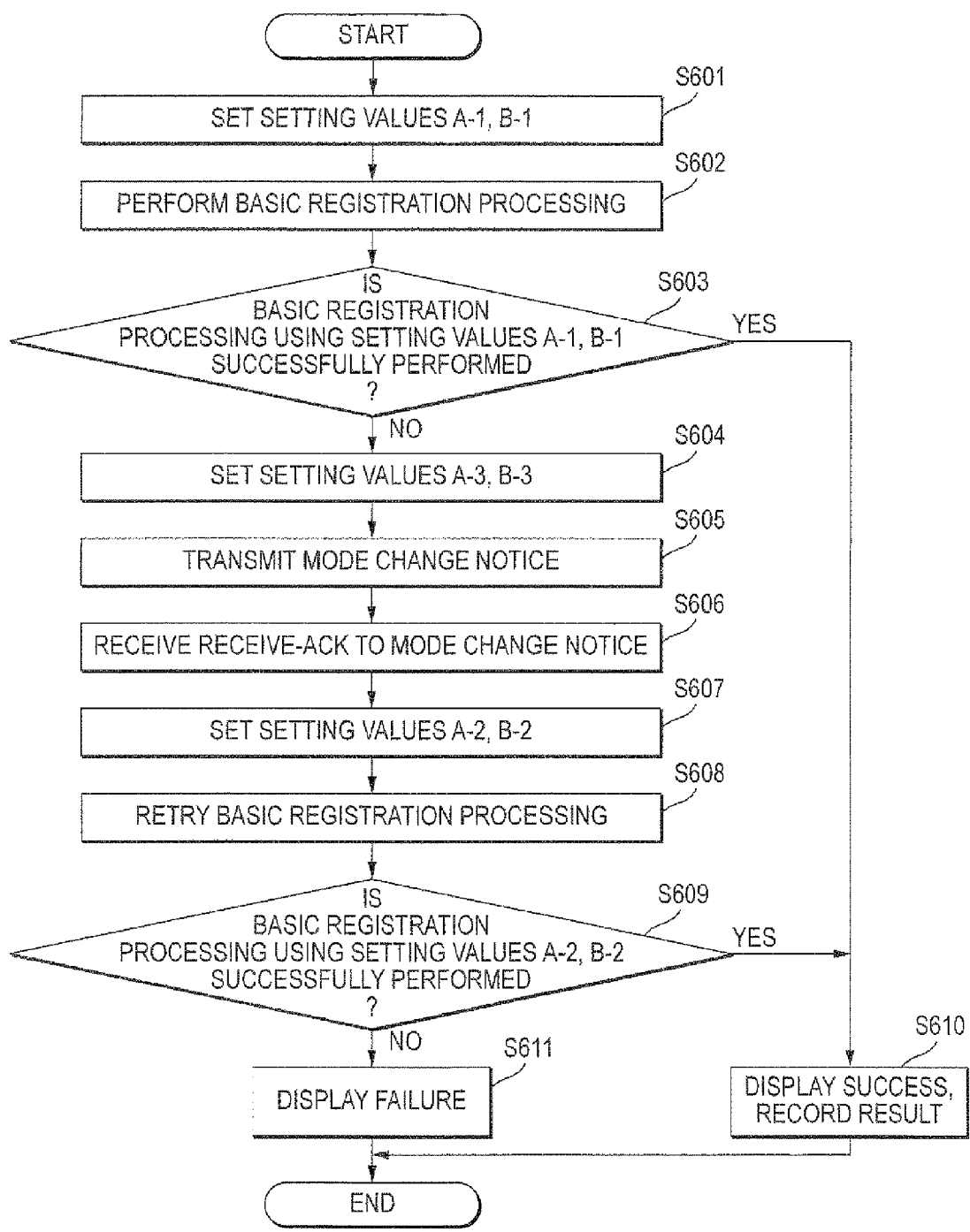
FIG. 12 is a flowchart showing an example of a second operation performed when a PLC modem acting as a slave device according to the embodiment of the present invention carries out the second applied registration processing.

FIG. 12 is a flowchart showing example second operation carried out when the PLC modem 100B performs the second applied registration processing. FIG. 12 shows an assumption that the transmission parameter (transmission power) described in connection with "A" and the parameter (the PAM value) described in connection with "B" are changed as shown in FIG. 5A or 5B. Parameters other than these transmission parameters may also be presumed to be changed as shown in FIGS. 5C to 5F. Most preferably, transmission power and the PAM value are changed. Reference symbols (A-1, B-1) designate yet-to-be-changed transmission parameters for the basic registration processing, and reference symbols (A-2, B-2) designate changed transmission parameters for the basic registration processing.

The PLC modem 100A often performs applied registration processing along with another PLC modem 100B (e.g., the unillustrated PLC modem 100B2) other than a PLC modem 100B (e.g., the unillustrated PLC modem 100B1) that is a target of applied registration processing. Applied registration processing and the basic registration processing shown in FIG. 12 represent applied registration processing and the basic registration processing performed between the PLC modem 100A and the predetermined PLC modem 100B.

In FIG. 12, when the controller 10 recognizes press of the setup button 106 of the PLC modem 100A, processing of the PLC modem 100A is commenced. When the controller 10 recognizes press of the setup button 106 of the PLC modem 100B, processing of the PLC modem 100B is initiated.

First, the controller 10 sets a setting value (A-1) and a setting value (B-1) of the transmission parameters in the setting register by reference to the storage 30 (step S601).

Subsequently, the controller 10 and the communicator 20 perform the basic registration processing by way of the PLC modem 100A, which is the target of the second applied registration processing, and the power line 700 (step S602). The controller 10 generates transmission data from the setting values (the setting value (A-1) and the setting value (B-1) in the present embodiment) of the transmission parameters set in the setting register.

Subsequently, the controller 10 determines whether or not the basic registration processing using the setting value (A-1) and the setting value (B-1) as transmission parameters has been successfully performed; namely, whether or not the basic registration processing has been completed without involvement of a failure (step S603). For instance, when a predetermined period of time of order of five seconds has elapsed since the press of the setup button 106 of the PLC modem 100B was recognized, the controller 10 determines that the basic registration processing ended in failure. The predetermined period of time is shorter than the predetermined period of time described as a time of timeout in the first applied connection processing.

Subsequently, the controller 10 sets setting values (A-3) and (B-3) of the transmission parameters in the setting register (step S604).

The communicator 20 transmits a mode change notice (step S605). At this time, the controller 10 generates a mode change notice in accordance with the setting values (A-3) and (B-3).

The communicator 20 subsequently receives a receive ACK responsive to the mode change notice (step S606).

The controller 10 then sets the setting values (A-2) and (B-2) of the transmission parameters in the setting register by reference to the storage 30 (step S607).

Next, the controller 10 and the communicator 20 retry the basic registration processing from the beginning or an intermediate point (step S608). The controller 10 generates transmission data from the setting values (the setting value (A-2) and the setting value (B-2) in the present embodiment) of the transmission parameters set in the setting register.

The controller 10 subsequently determines whether or not the basic registration processing using the setting value (A-2) and the setting value (B-2) as transmission parameters; namely, retry the basic registration processing, has been successfully performed, or has been completed without involvement of a failure (step S609).

When the basic registration processing (including a retry of processing) has been successfully performed, the controller 10 causes the display section 105 to display information showing success of the basic registration processing, and a result of registration processing is stored in the storage 30 (step S610).

When the basic registration processing using the setting value (A-2) and the setting value (B-2) as transmission parameters; namely, retry the basic registration processing, has ended in failure, the controller 10 causes the display section 105 to display information showing a failure of the basic registration processing (S611).

Although unillustrated, when the basic registration processing using the setting value (A-2) and the setting value (B-2) as transmission parameters; namely, retry the basic registration processing, has ended in failure, the basic registration processing may further be retry.

Figure 13:
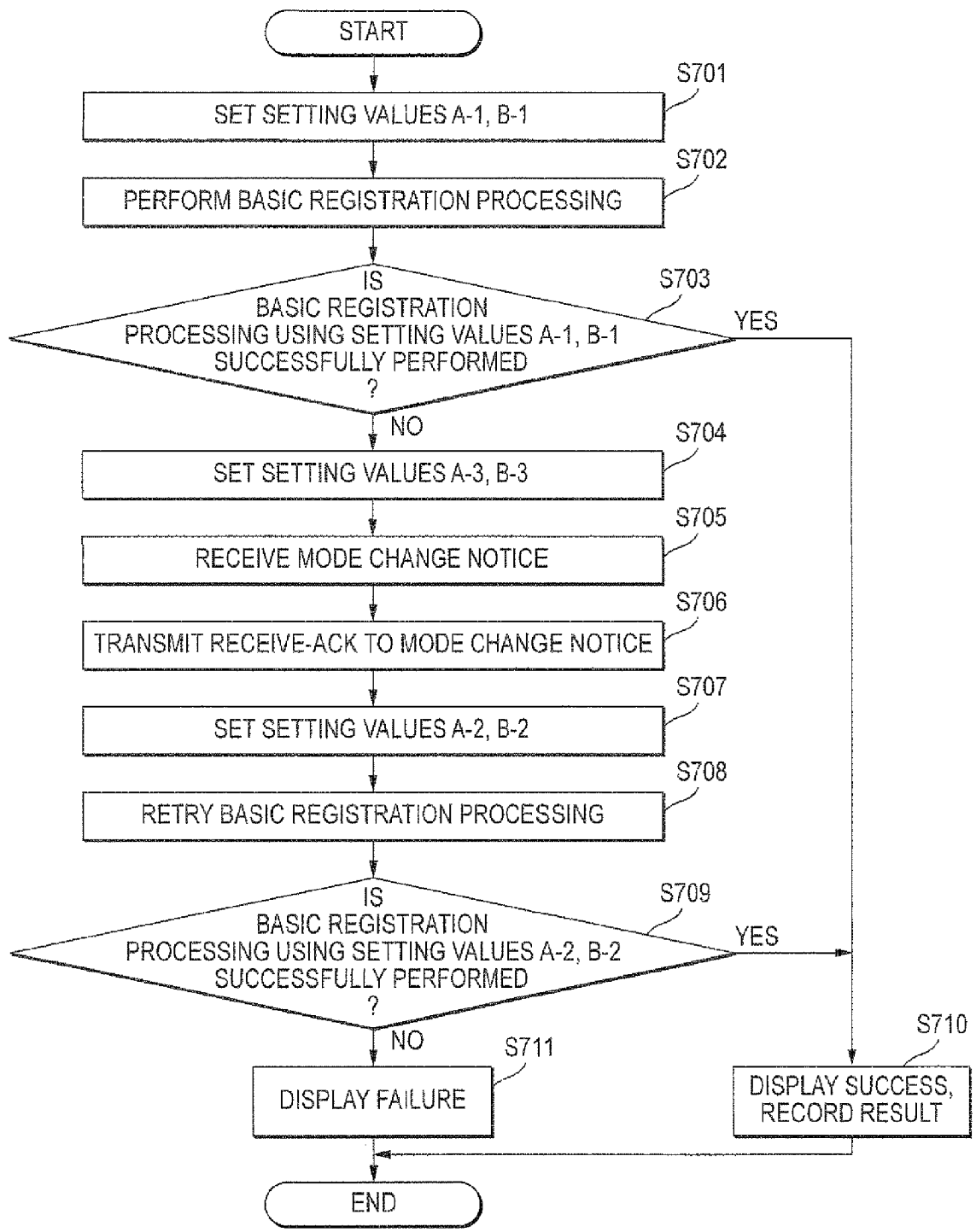
FIG. 13 is a flowchart showing an example of the second operation performed when a PLC modem acting as a master device according to the embodiment of the present invention carries out the second applied registration processing.

FIG. 13 is a flowchart showing example second operation performed when the PLC modem 100A performs the second applied registration processing. FIG. 13 shows an assumption that the transmission parameter (transmission power) described in connection with "A" and the parameter (the PAM value) described in connection with "B" are changed as shown in FIG. 5. Parameters other than these transmission parameters may also be presumed to be changed as shown in FIG. 5. Most preferably transmission power and the PAM value are changed. Reference symbols (A-1, B-1) represent yet-to-be-changed transmission parameters for the basic registration processing, and reference symbols (A-2, B-2) represent changed transmission parameters for the basic registration processing.

The PLC modem 100A often performs applied registration processing along with another PLC modem 100B (e.g., the unillustrated PLC modem 100B2) other than a PLC modem 100B (e.g., the unillustrated PLC modem 100B1) that is a target of the second applied registration processing. Applied registration processing and the basic registration processing shown in FIG. 13 represent applied registration processing and the basic registration processing performed between the PLC modem 100A and the predetermined PLC modem 100B.

In FIG. 13, when the controller 10 recognizes press of the setup button 106 of the PLC modem 10A, processing of the PLC modem 100A is commenced. When the controller 10 recognizes press of the setup button 106 of the PLC modem 100B, processing of the PLC modem 100B is initiated.

First, the controller 10 sets a setting value (A-1) and a setting value (B-1) of the transmission parameters in the setting register by reference to the storage 30 (step S701).

Subsequently, the controller 10 and the communicator 20 perform the basic registration processing by way of the PLC modem 100B, which is the target of the second applied registration processing, and the power line 700 (step S702). The controller 10 generates transmission data from the setting values (the setting value (A-1) and the setting value (B-1) in the present embodiment) of the transmission parameters set in the setting register.

Subsequently, the controller 10 determines whether or not the basic registration processing using the setting value (A-1) and the setting value (B-1) as transmission parameters has been successfully performed; namely, whether or not the basic registration processing has been completed without involvement of a failure (step S703). For instance, when a time of order of 10 seconds has elapsed since the press of the setup button 106 of the PLC modem 100A was recognized, the controller 10 determines that the basic registration processing ended in failure.

Subsequently, the controller 10 sets setting values (A-3) and (B-3) of the transmission parameters in the setting register (step S704). (A-3) and (B-3) are previously-described setting values for communication control.

The communicator 20 subsequently receives a mode change notice (step S705).

Steps S704 and S705 are not in particular order.

The communicator 20 next transmits a receive ACK responsive to the mode change notice in accordance with the setting values (A-3) and (B-3) (step S706).

The controller 10 sets the setting values (A-2) and (B-2) of the transmission parameters in the setting register by reference to the storage 30 (step S707).

Subsequently, the controller 10 and the communicator 20 retry the basic registration processing from the beginning or an intermediate point (step S708). The controller 10 generates transmission data from the setting values (the setting value (A-2) and the setting value (B-2) in the present embodiment) of the transmission parameters set in the setting register.

The controller 10 subsequently determines whether or not the basic registration processing using the setting value (A-2) and the setting value (B-2) as transmission parameters; namely, retry the basic registration processing, has been successfully performed, or has been completed without involvement of a failure (step S709).

When the basic registration processing (including a retry of processing) has been successfully performed, the controller 10 causes the display section 105 to display information showing success of the basic registration processing, and a result of registration processing is stored in the storage 30 (step S710).

When the basic registration processing using the setting value (A-2) and the setting value (B-2) as transmission parameters; namely, retry the basic registration processing, has ended in failure, the controller 10 causes the display section 105 to display information showing a failure of the basic registration processing (step S711).

Although unillustrated, when the basic registration processing using the setting value (A-2) and the setting value (B-2) as transmission parameters; namely, retry the basic registration processing, has ended in failure, the basic registration processing may further be retry.

An example timing chart employed when the PLC modem 100 performs second operation of the second applied registration processing will now be described.

FIG. 14B is a view showing an example timing chart of second operation of the second applied registration processing. FIG. 14B shows a change of at least a PAM value. In initial settings, both the PLC modem 100A and the PLC modem 100B assume 16 PAM. The timing chart is based on the presumption that a communication environment where the second applied registration processing is performed is comparatively poor and that a communicable distance is comparatively short.

FIG. 14B shows an assumption that the setup button 106 of the PLC modem 100A is pressed and that the setup button 106 of the PLC modem 100B is subsequently pressed within a predetermined period of time (e.g., five seconds). When the setup button 106 of the PLC modem 100B is not pressed within the predetermined period of time, the second applied registration processing is completed.

First, the PLC modem 100A recognizes the press of the setup button 106 of the PLC modem 100A at t=0.

Subsequently, the PLC modem 100B recognizes the press of the setup button 106 of the PLC modem 100B at t=4.5. Although the time of recognition is described as t=4.5 in the present embodiment, the essential requirement is that the press of the setup button 106 of the PLC modem 100B be recognized within a predetermined period of time (e.g., five seconds) after the press of the setup button 106 of the PLC modem 100B has been recognized. Therefore, no problem arises, so long as the period of time is; for instance, t<5. When the press of the setup buttons 106 of the PLC modem 100A and the PLC modem 100B are recognized, both the PLC modem 100A and the PLC modem 100B start the basic registration processing. The PLC modem 100B usually does not start the basic registration processing until a predetermined period of time (e.g., five seconds) elapses since press of the setup button 106 of the PLC modem 100B was recognized.

Subsequently, the basic registration processing of both the PLC modem 100A and the PLC modem 100B ends in failure at t=9.9. At this point in time, both the PLC modem 100A and the PLC modem 100B assume 16 PAM as a PAM value. A time t=9.9 is illustrative, and the essential requirement is that t<10 be fulfilled.

Subsequently, the PLC modem 100B transmits a mode change notice to the PLC modem 100A at t=11. Although the time t=11 is adopted herein, another timing may also be adopted, so long as the timing comes after the PLC modem 100B is recognized to have failed the basic registration processing.

The PLC modem 100A then transmits a receive ACK responsive to the mode change notice to the PLC modem 100B at t=11.5. Although a time t=11.5 is adopted herein, another timing may also be adopted, so long as the timing comes after receipt of the mode change notice. Transmission is usually performed within one second after receipt of the mode change notice.

The PLC modem 100A changes a transmission parameter at t=11.5. For instance, the PAM value is changed from 16 PAM to 8 PAM. The transmission parameters are changed when a predetermined period of time (e.g. 10 seconds: at a point in time of t=10) elapses (timeout occurs) since the press of the setup button 106 of the PLC modem 100A was recognized. A time t=11.5 is illustrative.

Subsequently, the PLC modem 100B changes the transmission parameters at t=12.0; for instance, the PAM value from 16 PAM to 8 PAM. The transmission parameters are changed after the PLC modem 100B has received the receive ACK responsive to the mode change notice from the PLC modem 100A. A time t=12.0 is illustrative.

The basic registration processing of the PLC modem 100A and the PLC modem 100B is successfully performed at t=12.5. Both the PLC modem 100A and the PLC modem 100B assume 8 PAM as a PAM value at this point in time.

Transmission of the mode change notice performed by the PLC modem 100B and transmission of an ACK responsive to the mode change notice performed by the PLC modem 100A have been described as second operation of the second applied connection processing. When the PLC modem 100A has undergone timeout before receiving the mode change notice from the PLC modem 100B, the PLC modem 100A may also transmit the mode change notice. In this case, the PLC modem 100B can change the transmission parameters in accordance with the mode change notice.

As mentioned above, according to second operation of the second applied registration processing, even when a plurality of PLC modems 100 are connected to the power line 700, registration processing can be reliably performed between desired PLC modems 100. Further, by means of the mode change notice form the PLC modem 100A, transmission parameters can be changed before elapse of a predetermined period of time (e.g., 10 seconds) since the press of the setup button 106 of the PLC modem 100B was recognized; hence, a time required by applied registration processing can be shortened.

This application is based upon and claims the benefit of priority of Japanese Patent Application No. 2008-35930 filed on Feb. 18, 2008, the contents of which are incorporated herein by reference in its entirety.

The present invention is useful for a power line communication apparatus, a power line communication system, and a registration processing method that control a communicable distance, thereby enabling reliable registration processing in conjunction with desired power line communication apparatuses without transmission of a registration signal over a distance up to a point where registration can be performed along with a power line communication apparatus of a neighboring house.

What is claimed is:

1. A power line communication apparatus for controlling a transmission using a plurality of parameters, comprising:
   a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and
   a parameter controller which changes the first parameter to the third value and the second parameter to the fourth value when the registration process has ended in failure to adjust a communicable distance,
   wherein the first parameter is a signal intensity of a transmission signal for representing the transmission data, wherein the second parameter is an information volume to be superimposed on a carrier for transmitting the transmission data, and wherein the parameter controller increases the signal intensity to lengthen the communicable distance, and increases the information volume to shorten the communicable distance.

2. A power line communication apparatus for controlling a transmission using a plurality of parameters, comprising:
   a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and
   a parameter controller which changes the first parameter to the third value and the second parameter to the fourth value when the registration process has ended in failure to adjust a communicable distance,
   wherein the first parameter is an information volume to be superimposed on a carrier for transmitting the transmission data, wherein the second parameter is a signal intensity of a transmission signal for representing the transmission data, and wherein the parameter controller decreases the information volume to lengthen the communicable distance, and decreases the signal intensity to shorten the communicable distance.

3. A power line communication apparatus for controlling a transmission using a plurality of parameters, comprising:
   a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and
   a parameter controller which changes the first parameter to the third value and the second parameter to the fourth value when the registration process has ended in failure to adjust a communicable distance,
   wherein the first parameter is an information volume of error correction information contained in the transmission data, wherein the second parameter is an information volume to be superimposed on a carrier for transmitting the transmission data, and wherein the parameter controller increases the information volume of the error correction information to lengthen the communicable distance, and increases the information volume to be superimposed on the carrier to shorten the communicable distance.

4. A power line communication apparatus for controlling a transmission using a plurality of parameters, comprising:
   a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and
   a parameter controller which changes the first parameter to the third value and the second parameter to the fourth value when the registration process has ended in failure to adjust a communicable distance,
   wherein the first parameter is an information volume to be superimposed on a carrier for transmitting the transmission data, wherein the second parameter is an information volume of error correction information contained in the transmission data, and wherein the parameter controller decreases the information volume to be superimposed on the carrier to lengthen the communicable distance, and decreases the information volume of the error correction information to shorten the communicable distance.

5. A power line communication apparatus for controlling a transmission using a plurality of parameters, comprising:
   a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and
   a parameter controller which changes the first parameter to the third value and the second parameter to the fourth value when the registration process has ended in failure to adjust a communicable distance,
   wherein the first parameter is an information volume of error correction information contained in the transmission data, wherein the second parameter is a signal intensity of a transmission signal for representing the transmission data, and wherein the parameter controller increases the information volume to lengthen the communicable distance, and decreases the signal intensity to shorten the communicable distance.

6. A power line communication apparatus for controlling a transmission using a plurality of parameters, comprising:

a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value; and a parameter controller which changes the first parameter to the third value and the second ammeter to the fourth value when the registration process has ended in failure to adjust a communicable distance, wherein the first parameter is a signal intensity of a transmission signal for representing the transmission data, wherein the second parameter is an information volume of error correction information contained in the transmission data, and wherein the parameter controller increases the signal intensity to lengthen the communicable distance, and decreases the information volume to shorten the communicable distance.

7. A power line communication apparatus for controlling a transmission using a plurality of parameters, comprising:

a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value;

a parameter controller which changes the first parameter to the third value and the second parameter to the fourth value when the registration process has ended in failure to adjust a communicable distance; and a mode change notifier that transmits a mode change notice for changing the first and second parameters, wherein the mode change notifier transmits the mode change notice including time information for holding change of the first and second parameters in a standby state for a set time when the registration process has ended in failure; and wherein the parameter controller changes the first and second parameters after elapse of the set time from a time of transmission of the mode change notice.

8. A power line communication apparatus for controlling a transmission using a plurality of parameters, comprising:

a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value;

a parameter controller which changes the first parameter to the third value and the second parameter to the fourth value when the registration process has ended in failure to adjust a communicable distance; and a mode change notifier that transmits a mode change notice for changing the first and second parameters, wherein the parameter controller performs at least one of an operation for setting the first parameter to a fifth value that makes the communicable distance longer than does the third value and operation for setting the second parameter to a sixth value that makes the communicable distance longer than does the second value, and wherein the mode change notifier transmits the mode change notice in accordance with at least one of the first parameter set at the fifth value and the second parameter set at the sixth value.

9. A power line communication apparatus for controlling a transmission using a plurality of parameters, comprising:

a registration processor which performs a registration process for achieving a state to be communicable with another power line communication apparatus through a power line by use of transmission data based on a first parameter set at a first value and a second parameter set at a second value, wherein when the registration process has ended in failure, the registration processor retries the registration process by use of transmission data based on the first parameter set at a third value;

a parameter controller which changes the first parameter to the third value and the second parameter to the fourth value when the registration process has ended in failure to adjust a communicable distance; and a receiver which receives a mode change notice for changing the first and second parameters, wherein the parameter controller changes the first and second parameters in accordance with the mode change notice when the registration process has ended in failure, wherein the receiver receives the mode change notice including timing information for holding change of the first and second parameters in a standby state for a set time, and wherein the parameter controller changes the first and second parameters after elapse of the set time from a time of reception of the mode change notice.

10. A registration processing method for a power line communication apparatus which controls a transmission using a plurality of parameters, the method comprising:

performing a registration process for achieving a state to be communicable with another power line communication apparatus through a power line by use of transmission data based on a first parameter set at a first value and a second parameter set at a second value;

changing the first parameter to a third value so as to lengthen a communicable distance and the second parameter to a fourth value so as to shorten the communicable distance when the registration process has ended in failure; and retrying, when the registration process has ended in failure, the registration process by use of transmission data based on the first parameter set at the third value and the second parameter set at the fourth value.

* * * * *